United States Patent
Lee et al.

(10) Patent No.: US 9,489,101 B2
(45) Date of Patent: Nov. 8, 2016

(54) TOUCH PANEL AND TOUCH DEVICE WITH THE SAME

(71) Applicant: LG INNOTEK CO., LTD., Seoul (KR)

(72) Inventors: Dong Keon Lee, Seoul (KR); Hyun Soo Kim, Seoul (KR); Jun Sik Shin, Seoul (KR); Joon Hyuk Yang, Seoul (KR); Jung Hwan Bang, Seoul (KR); Chan Kyu Koo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 21 days.

(21) Appl. No.: 14/226,320

(22) Filed: Mar. 26, 2014

(65) Prior Publication Data
US 2014/0292714 A1    Oct. 2, 2014

(30) Foreign Application Priority Data

Mar. 26, 2013  (KR) .................. 10-2013-0032090
Jun. 19, 2013  (KR) .................. 10-2013-0070527
Jul. 29, 2013  (KR) .................. 10-2013-0089658

(51) Int. Cl.
*G06F 3/046* (2006.01)
*G06F 3/044* (2006.01)

(52) U.S. Cl.
CPC .............. *G06F 3/046* (2013.01); *G06F 3/044* (2013.01); *G06F 2203/04103* (2013.01)

(58) Field of Classification Search
CPC ......... G06F 3/044; G06F 3/041; G06F 3/046
See application file for complete search history.

(56) References Cited

U.S. PATENT DOCUMENTS

| | | | |
|---|---|---|---|
| 5,214,724 A * | 5/1993 | Seino ...................... G02F 1/035 385/2 |
| 2010/0007627 A1* | 1/2010 | Lai et al. ...................... 345/174 |
| 2012/0031746 A1 | 2/2012 | Hwang et al. |
| 2012/0318585 A1 | 12/2012 | Kim et al. |
| 2013/0082970 A1 | 4/2013 | Frey et al. |

FOREIGN PATENT DOCUMENTS

WO    WO-2011/156447 A1    12/2011

OTHER PUBLICATIONS

International Search Report in International Application No. 14161853.8.

* cited by examiner

*Primary Examiner* — Larry Sternbane
*Assistant Examiner* — Sepehr Azari
(74) *Attorney, Agent, or Firm* — Saliwanchik, Lloyd & Eisenschenk

(57) ABSTRACT

A touch panel includes a substrate; and a sensing electrode with a conductive pattern on the substrate, wherein the sensing electrode includes: an electrode layer; and a first buffer layer on the electrode layer.

15 Claims, 26 Drawing Sheets

TOUCH PANEL AND TOUCH DEVICE WITH THE SAME

CROSS-REFERENCE TO RELATED APPLICATIONS

This application claims the benefit under 35 U.S.C. §119 of Korean Patent Application Nos. 10-2013-0032090, filed Mar. 26, 2013, 10-2013-0070527, filed Jun. 19, 2013, and 10-2013-0089658, filed Jul. 29, 2013 which are hereby incorporated by reference in their entirety.

BACKGROUND

The embodiment relates to a touch panel and a touch device with the same.

Recently, a touch panel, which performs an input function through the touch of an image displayed on a touch device by an input device such as a stylus pen or a hand, has been applied to various electronic appliances.

The touch panel may be mainly classified into a resistive touch panel and a capacitive touch panel. In the resistive touch panel, the position of the touch point is detected by detecting the variation of resistance according to the connection between electrodes when pressure is applied to an input device. In the capacitive touch panel, the position of the touch point is detected by detecting the variation in capacitance when a finger of the user is touched on the capacitive touch panel between electrodes. When taking of the convenience of a fabrication scheme and a sensing power, recently, the capacitive touch panel has been spotlighted in a small-model touch panel.

Indium tin oxide (ITO), which has been most extensively used as a transparent electrode of the touch panel, has high cost and is easily subject to physical damage due to the bending or the flection of a substrate, so that the characteristic of the ITO for the electrode part is deteriorated. Accordingly, the ITO is not suitable for a flexible device. Further, when the ITO is applied to a touch panel having a large size, a problem occurs due to high resistance.

BRIEF SUMMARY

The embodiment provides a touch panel representing improved reliability and a touch device with the same.

According to the embodiment, there is provided a touch panel including a touch panel includes a substrate; and a sensing electrode with a conductive pattern on the substrate, wherein the sensing electrode includes: an electrode layer; and a first buffer layer on the electrode layer.

A sensing electrode of the touch panel according to the embodiment has a conductive pattern so that the pattern of the sensing electrode may be hidden in the active area. That is, the pattern may not be viewed even if the sensing electrode is made from a metal. In addition, even when the sensing electrode is applied to a large-size touch panel, the resistance of the touch panel can be reduced. In addition, even when the sensing electrode is formed through the printing process, the printing quality can be improved so that the high-quality touch panel can be ensured.

Further, the sensing electrode may include the first buffer layer disposed on the electrode layer, and the first buffer layer can prevent the electrode layer from being over-etched. Accordingly, the thickness of the electrode layer may be ensured so that electric characteristics can be improved. That is, during an etching process, the resistance increase caused by the reduction of the thickness of the electrode layer can be prevented.

Moreover, the sensing electrode may include a second buffer layer disposed under the electrode layer, and the second buffer layer can ensure the adhesive strength of the electrode layer. The electrode layer can be prevented from being delaminated due to the second buffer layer.

In addition, according to another embodiment, a top surface of the first buffer layer has an area wider than an area of a top surface of the sensing electrode. Due to the first buffer layer, the increase of visibility due to light reflected from the sensing electrode including the metallic material can be prevented. Particularly, the first buffer layer can reduce reflectivity of a lateral side of the sensing electrode as well as the top surface of the sensing electrode so that the touch panel is advantageous in terms of visibility. In addition, the visibility can be improved even at a wide viewing angle. Therefore, optical characteristics of the sensing electrode can be improved.

DETAILED DESCRIPTION

Figure 1:
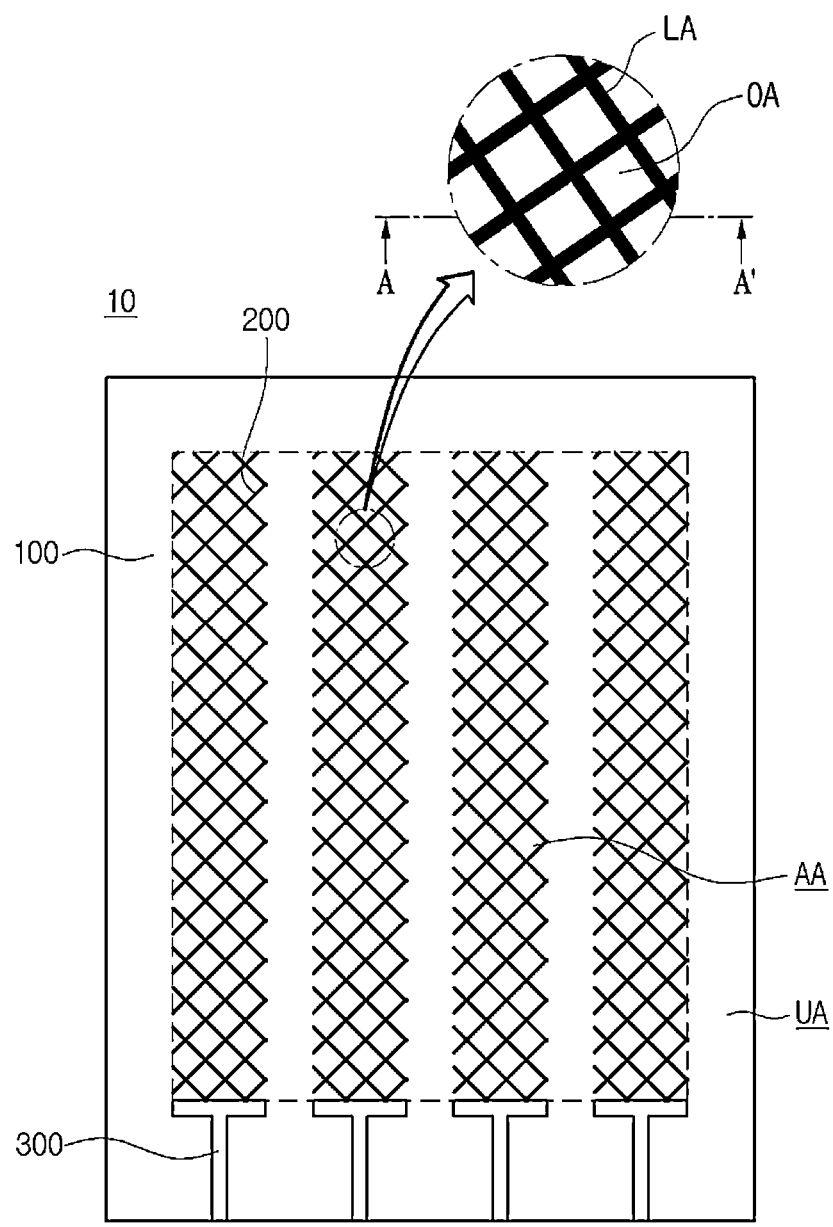
FIG. 1 is a plan view showing a touch panel according to an embodiment.

In the following description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, the embodiments will be described in detail with reference to the accompanying drawings.

Figure 2:
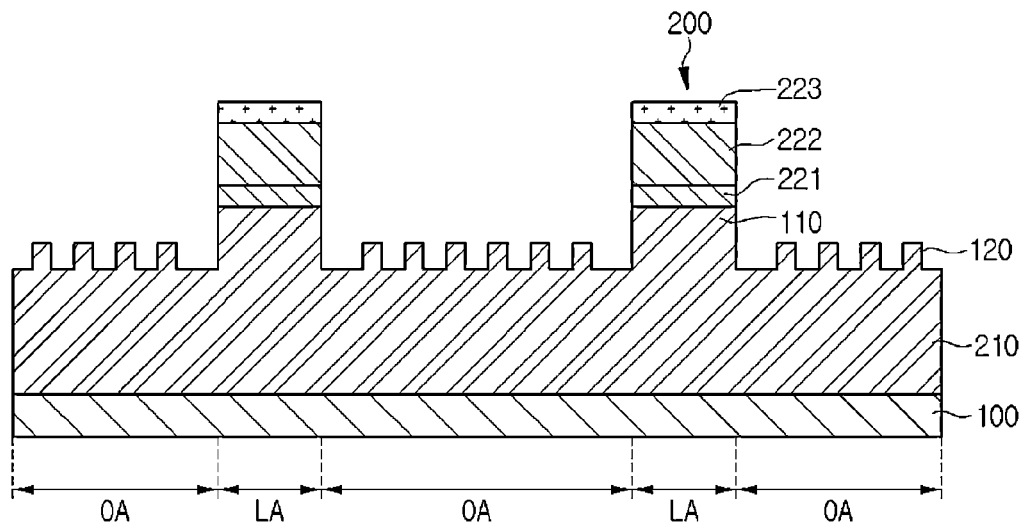
FIG. 2 is a sectional view taken along line A-A' of FIG. 1.

First, the touch window according to the embodiment will be described in detail with reference to FIGS. 1 and 2. FIG. 1 is a plan view showing a touch panel according to an embodiment. FIG. 2 is a sectional view taken along line A-A' of FIG. 1.

Referring to FIG. 1, the touch panel 10 according to the embodiment includes a substrate 100 in which an active area AA to detect the position of an input device (e.g., finger) and an unactive area UA provided at a peripheral portion of the active area AA are defined.

In this case, the active area AA may be provided therein with sensing electrodes 200 that may sense the input device. In addition, the unactive area UA may be provided therein with wires 300 electrically connecting the sensing electrodes 200 to each other. Further, the unactive area UA may be provided therein with an external circuit connected to the wires 300.

If the input device such as the finger touches the touch panel, the variation of capacitance occurs in the touched part by the input device, and the touched part subject to the variation of the capacitance may be detected as a touch point.

Hereinafter, the touch panel will be described in more detail.

The substrate 100 may include various materials to support the sensing electrodes 200, the wires 300, and a circuit board formed on the substrate 100. For instance, the substrate 100 may include a glass substrate or a plastic substrate. For example, the substrate 100 may include plastic such as polyethylene, polypropylene, acryl, and polyethylene terephthalate (PET).

The outer dummy layer is formed in the unactive area UA of the substrate 100. The outer dummy layer may be coated with a material having a predetermined color so that the wires 300 and a printed circuit board connecting the wires 300 to external circuits cannot be seen from the outside. The outer dummy layer may have a color suitable for a desired outer appearance thereof. For instance, the outer dummy layer may include black pigment to represent black color. In addition, a desired logo may be formed in the outer dummy layer through various methods. The outer dummy layer may be formed through a deposition, print, or wet coating scheme.

The sensing electrode 200 may be formed on the substrate 100. The sensing electrode 200 may detect whether the input device such as the finger is touched. FIG. 1 illustrates the sensing electrode 200 extending in one direction on the substrate 100, but the embodiment is not limited thereto. Accordingly, the sensing electrode 200 may extend in a direction crossing the one direction. In addition, the sensing electrode 200 may two types of electrode parts having a shape extending in one direction and a shape extending in another direction.

Meanwhile, the sensing electrode 200 may include a conductive pattern. The sensing electrode 200 is arranged in the shape of a mesh. In particular, the sensing electrode 200 includes a mesh opening OA and a mesh line LA. In this case, a line width of the mesh line LA may be in the range of 0.1 µm to 10 µm. A mesh line LA of 0.1 µm or less may not be formed due to the characteristic of the manufacturing process. If the line width is 10 µm or less, the pattern of the sensing electrode 200 may not be viewed. Preferably, the line width of the mesh line LA may be in the range of 1 µm to 5 µm. More preferably, the line width of the mesh line LA may be in the range of 1 µm to 3 µm.

Meanwhile, as shown in FIG. 1, the mesh opening OA may have the shape of a rectangle, but the embodiment is not limited thereto. The mesh opening OA may have various shapes such as a polygonal shape including a diamond shape, a pentagonal shape, or a hexagonal shape, or a circular shape.

Further, the embodiment is not limited thereto. The conductive pattern may have an irregular shape. That is, various mesh openings may be provided in one conductive pattern. Accordingly, the sensing electrode 200 may include a mesh opening with various shapes.

As the sensing electrode 200 has the shape of the mesh, the pattern of the sensing electrode 200 may not be viewed in the active area AA. In other words, even when the transparent sensing electrode 200 includes metal, the pattern may not be viewed. In addition, even when the sensing electrode 200 is applied to a large-size touch window, the resistance of the touch window can be reduced. Further, when the transparent sensing electrode 216 is formed through the printing process, the printing quality can be improved so that the high-quality touch window can be ensured.

Referring to FIG. 2, the sensing electrode 200 may include a first sub-pattern 110, a second sub-pattern 120, an electrode layer 222, a first buffer layer 223, and a second buffer layer 221.

Meanwhile, the first sub-pattern 110 and the second sub-pattern 120 may be formed by imprinting a resin layer 210.

The first sub-pattern 110 is disposed on the resin layer 210. The first sub-pattern 110 is disposed on the mesh line LA. Accordingly, the first sub-pattern 110 is arranged in the shape of a mesh. The first sub-pattern 110 may be convex form.

The second sub-pattern 120 is disposed on the resin layer 210. The second sub-pattern 120 is disposed on the mesh line LA. Accordingly, the second sub-pattern 120 may be disposed between first sub-patterns 110. The second sub-pattern 120 may be convex form.

The first sub-pattern 110 and the second sub-pattern 120 may include resin and polymer.

The electrode layer 222 is disposed on the first sub-pattern 110. The electrode layer 222 is disposed at the mesh line LA, and is arranged in the shape of a mesh. The electrode layer 222 may include various metals having high electrical conductivity. For example, the electrode layer 222 may include Cu, Au, Ag, Al, Ti, Ni, or an alloy thereof.

The first buffer layer 223 is disposed on the electrode layer 222. The first buffer layer 223 may protect the electrode layer 222.

The first buffer layer 223 may include metal. In this case, the first buffer layer and the electrode layer 222 may include mutually different materials, respectively. In detail, the first buffer layer 223 and the electrode layer 222 may include mutually different materials to react with mutually different etching solutions. That is, the first buffer layer 223 and the electrode layer 222 may be selectively etched.

The first buffer layer 223 can prevent the electrode layer 222 from being over-etched. Accordingly, the thickness of the electrode layer 222 can be ensured so that electric characteristics of the electrode layer 222 may be maintained. That is, during an etching process, the resistance increase caused by the reduction of the thickness of the electrode layer 222 can be prevented.

Meanwhile, the first buffer layer 223 may include a darkening layer. In this case, the first buffer layer 223 may include metal oxide, metal nitride, and metal oxynitride. Due to the first buffer layer 223, the increase of visibility due to light reflected from the electrode layer 222 can be prevented.

The second buffer layer 221 is disposed between the first sub-pattern 110 and the electrode layer 222. The second buffer layer 221 can ensure the adhesive strength between the first sub-pattern 110 and the electrode layer 222. The electrode layer 222 can be prevented from being delaminated from the first sub-pattern 110 through the second buffer layer.

The second buffer layer 221 may include various materials capable of improving an adhesive strength. For example, the second buffer layer 221 may include the same material as that of the first buffer layer 223.

Meanwhile, although it has been illustrated in the drawing that all of the second buffer layer 221, the electrode layer 222, and the first buffer layer 223 are formed, the embodiment is not limited thereto. The second buffer layer 221 may be omitted.

The wire 300 may be formed at the unactive area UA such that the wire 300 can be hidden. The wire 300 may apply an electric signal to the sensing electrode 200. The wire 300 may be formed at the unactive area UA not to be viewed.

Meanwhile, although not shown, a circuit board connected to the wire 300 may be provided. Various types of printed circuit boards may be used as the printed circuit board. For instance, a flexible printed circuit board (FPCB) may be used as the printed circuit board.

Figure 3:
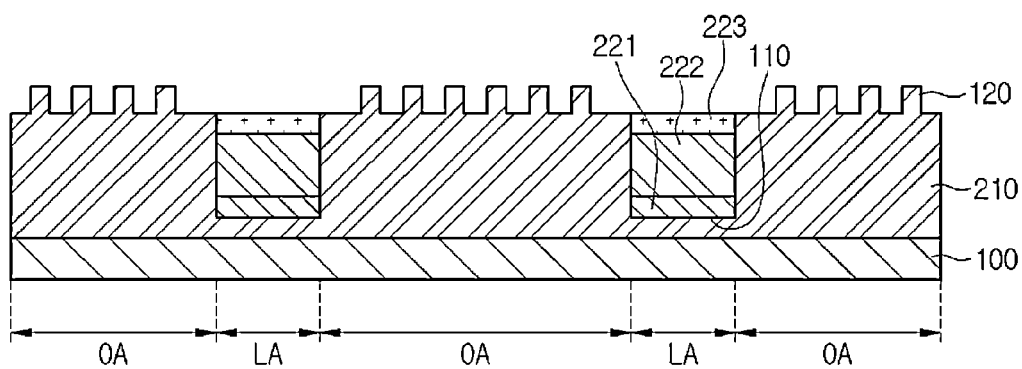
FIG. 3 is a sectional view showing a touch panel according to another embodiment.

Hereinafter, a touch window according to another embodiment will be described with reference to FIG. 3. For the purpose of simplicity and clarity, the description about the elements identical to or similar to those of the first embodiment will be omitted. FIG. 3 is a sectional view showing a touch panel according to another embodiment.

Referring to FIG. 3, the first sub-pattern 110 is recessed. The first sub-pattern 110 may be a concave form. That is, the resin layer 210 may include the recessed first sub-pattern 110. In this case, the electrode layer 222, the first buffer layer 223, and the second buffer layer 221 may be disposed in the first sub-pattern 110. In detail, the second buffer layer 221, the electrode layer 222, and the first buffer layer 223 may be sequentially stacked in the first sub-pattern 110. In this case, the second buffer layer 221, the electrode layer 222, and the first buffer layer 223 may be formed by depositing, plating, or filling an electrode material. Preferably, the second buffer layer 221, the electrode layer 222, and the first buffer layer 223 may be formed by filling the electrode material. In this case, the number of processes, a process time, and a process cost in the filling process may be reduced as compared with those of the plating process or the deposition process.

Although the second buffer layer 221, the electrode layer 222, and the first buffer layer 223 are illustrated in FIG. 3, the embodiment is not limited thereto.

Hereinafter, a method of manufacturing a touch panel according to the embodiment will be described with reference to FIGS. 4 to 9. FIGS. 4 to 9 are sectional views showing a method for manufacturing the touch panel according to the embodiment.

Figure 4:
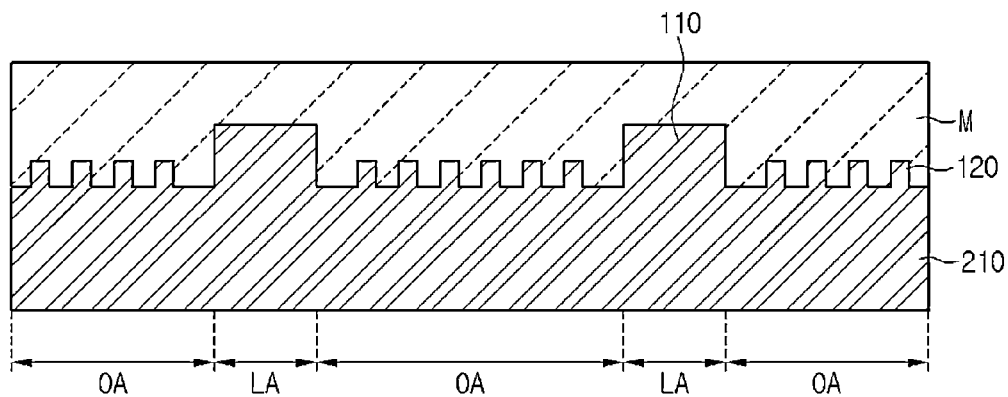
FIGS. 4 to 9 are sectional views showing a method of manufacturing the touch panel according to the embodiment.

First, referring to FIG. 4, preferably, a mold M on which a desired pattern is formed may be disposed and imprinted on a transparent layer 210, preferably, a resin layer 210.

Figure 5:
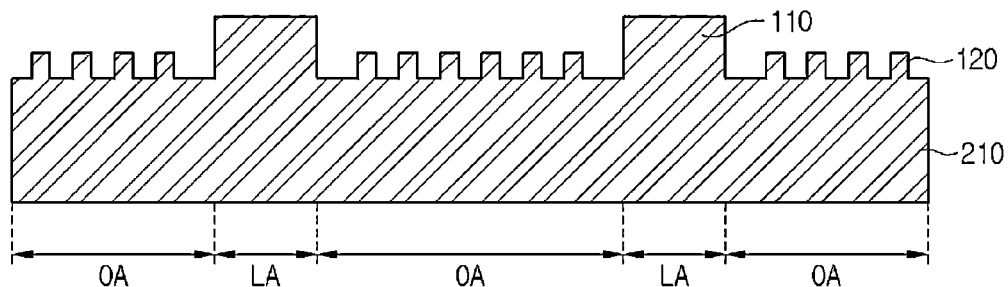

Referring to FIG. 5, the first sub-pattern 110 and the second sub-pattern 120 may be manufactured through the imprinting process.

Figure 6:
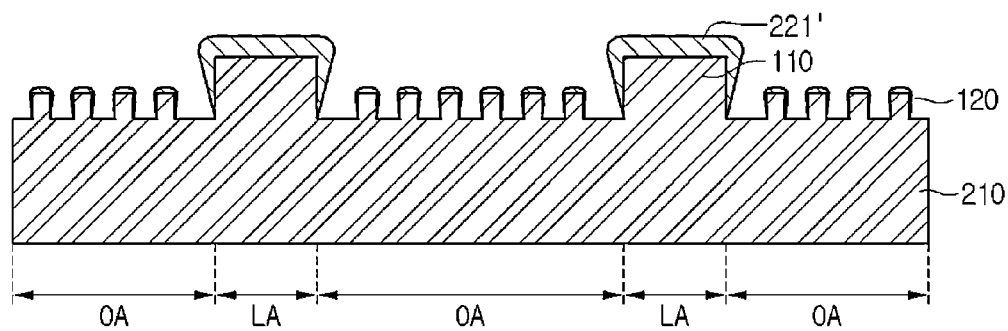

Referring to FIG. 6, a second buffer material 221' may be formed on the first sub-pattern 110 and the second sub-pattern 120.

Figure 7:
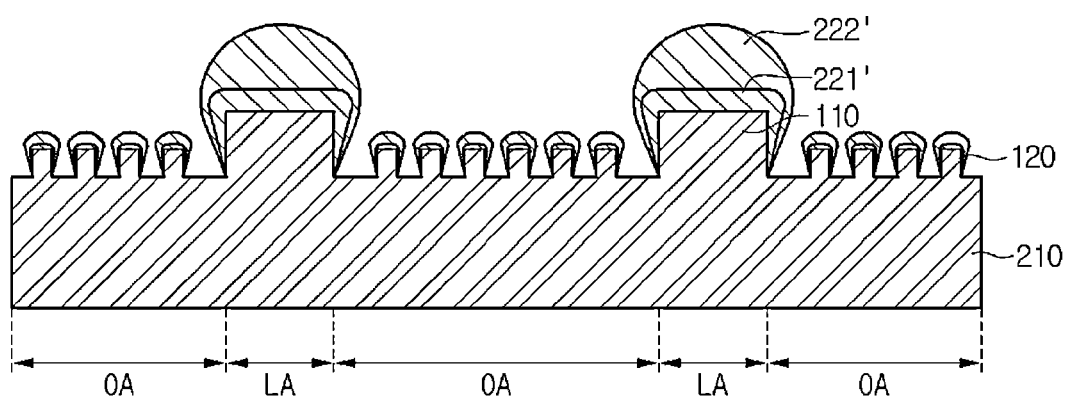

Referring to FIG. 7, an electrode material 222' may be formed on the second buffer material 221'. The electrode material 222' may be formed through a deposition process or a plating process.

Figure 8:
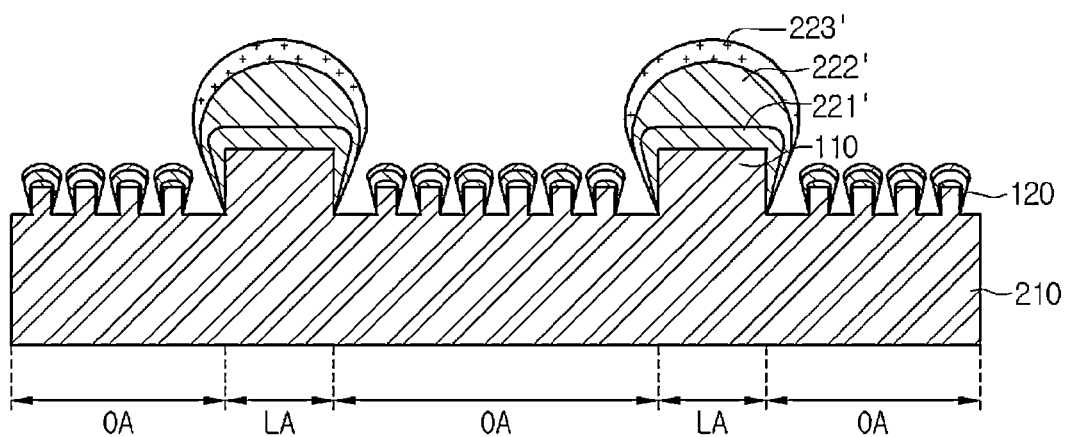

Referring to FIG. 8, a first buffer material 223' may be formed on the electrode material 222'.

Figure 9:
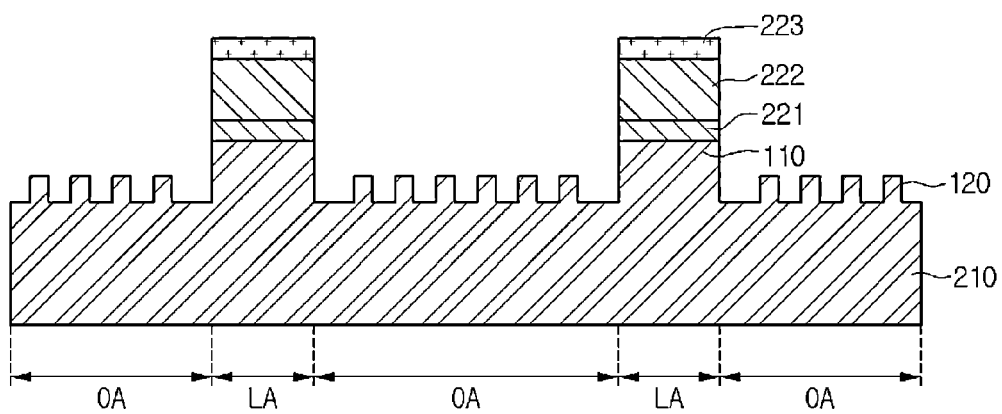

Referring to FIG. 9, the second buffer material 221', the electrode material 222', and the first buffer material 223' may be etched. In this case, an etch area may vary depending on structures of the first sub-pattern 110 and the second sub-pattern 120 and a contact area with respect to the electrode material 222'. That is, since a contact area between the first sub-pattern 110 and the electrode material 222' is larger than a contact area between the second sub-pattern 120 and the electrode material 222', the electrode material 222' formed on the first sub-pattern 110 is less etched. That is, the electrode material 222' remains on the first sub-pattern 110 and the electrode material 222' formed on the second sub-pattern 120 is etched and removed under the same etching rate. As a result, the second buffer material 221' and the first buffer material 223' formed on the second sub-pattern 120 may be lifted-off and removed. Accordingly, an electrode layer 222 may be formed on the first sub-pattern 110 and may be arranged in the shape of a mesh.

Meanwhile, variation in a thickness of the electrode material 222' formed on the first sub-pattern 110 may be minimized upon etching due to the first buffer material 223' formed on the electrode material 222'. That is, the first buffer material 223' may protect the electrode material 222' so that a thickness may maintain after an etching process.

Figure 10:
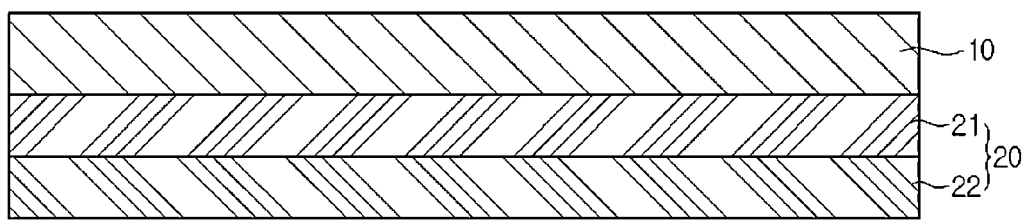
FIG. 10 is a sectional view illustrating a touch device where a touch panel according to the embodiment is disposed on a display panel.

Meanwhile, referring to FIG. 10, the touch panel 10 may be disposed on the display panel 20. The touch panel 10 is combined with a display panel 20 so that a touch device may be formed.

The display panel 20 is formed therein with a display region to display an image. Generally, the display panel applied to the touch device may include an upper substrate 21 and a lower substrate 22. A data line, a gate line, and a thin film transistor TFT may be formed on the lower substrate 22. The upper substrate 21 may adhere to the lower substrate 22 to protect constituent elements disposed on the lower substrate 22.

The display panel 20 may have various shapes according to the type of the display device. That is, the touch device according to the embodiment may include an LCD, a field emission display, a plasma display panel (PDP), an organic light emitting diode (OLED), and an electrophoretic display (EPD). Accordingly, the display panel 20 may be configured to have various shapes.

Meanwhile, the touch panel 10 may be applied not only mobile phone but also car. In other words, the touch panel 10 may be applied with Personal Navigation Display (PND) like car navigation device, also Center Information Display (CID) like dashboard. But, the embodiment is not limited thereto. So the embodiment may be applied various electronic device.

Figure 11:
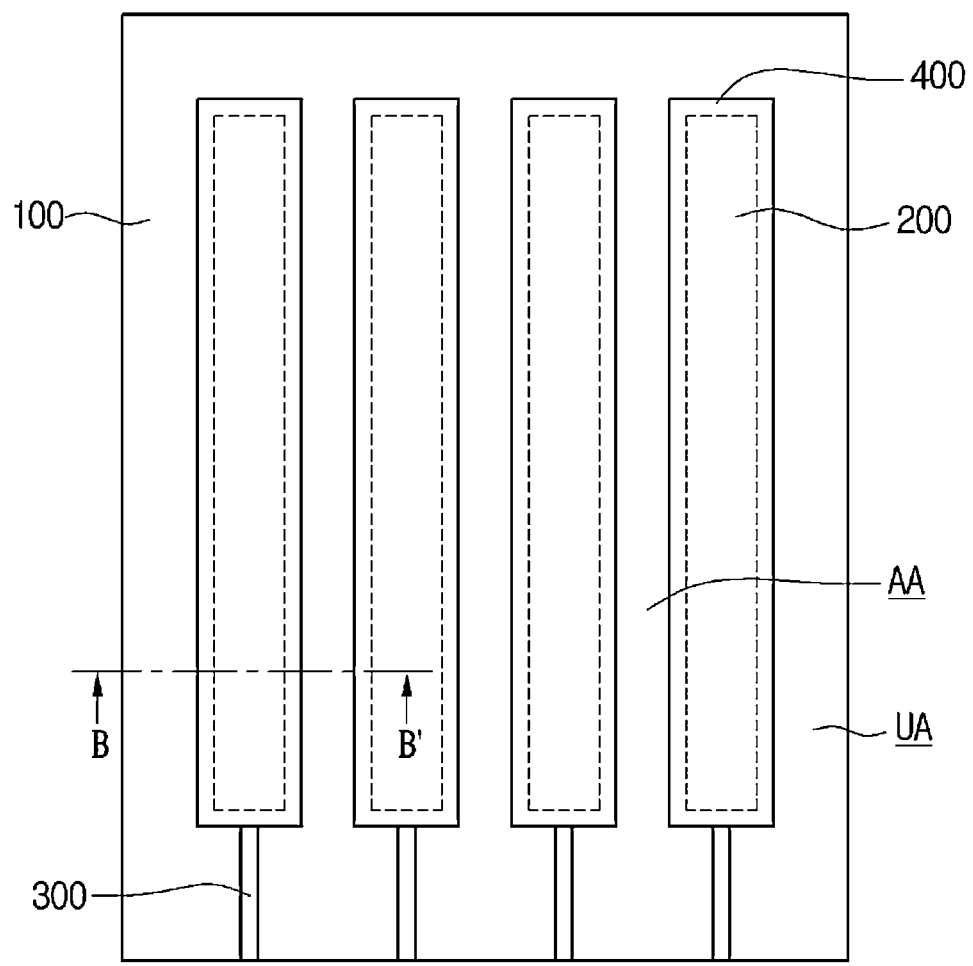
FIG. 11 is a plan view showing a touch panel according to another embodiment.

Meanwhile, referring to FIG. 11, the sensing electrode 200 may include a conductive pattern. A first buffer layer 400 is disposed on the sensing electrode 200. That is, the first buffer layer 400 may be disposed on the conductive layer of the sensing electrode 200. The first buffer layer 400 may be disposed on a top surface 200a of the sensing electrode 200.

A top surface 400a of the first buffer layer 400 has an area wider than an area of the top surface 200a of the sensing electrode 200. Accordingly, the first buffer layer 400 may fully cover the top surface 200a of the sensing electrode 200.

Further, a line width L2 of the first buffer layer 400 is greater than a line width L1 of the sensing electrode 200. That is, a length L2 of one section of the first buffer layer 400 is greater than a length L1 of one section of the sensing electrode 200. In detail, a ratio of the line width L1 of the sensing electrode 200 to the line width L2 of the first buffer layer 400 may be in the range of 1:1.3 to 1:2. When the ratio of the line width L1 of the sensing electrode 200 to the line width L2 of the first buffer layer 400 is less than 1:1.3, the first buffer layer 400 has a difficulty to sufficiently cover the top surface 200a of the sensing electrode 200 so that the first buffer layer 400 may not serve as a reflection prevention layer. In addition, the ratio of the line width L1 of the sensing electrode 200 to the line width L2 of the first buffer layer 400 may not increase over 1:2 due to the limitation in the manufacturing process.

Meanwhile, the first buffer layer 400 may be partially spaced apart from the sensing electrode 200. That is, the first buffer layer 400 may be partially spaced apart from the sensing electrode 200 by a predetermined distance D.

In detail, the first buffer layer 400 includes a first reflection prevention part 410 and a second reflection prevention part 420. The second reflection prevention part 420 may surround the first reflection prevention part 410. The second reflection prevention part 420 may be disposed at an outer portion of the first reflection prevention part 410. The first reflection prevention part 410 is disposed at a top surface 200a of the sensing electrode 200. The second reflection prevention part 420 extends from the first reflection prevention part 410 and is disposed at a lateral side 200e of the sensing electrode 200. In this case, the second reflection prevention part 420 may be spaced from the lateral side 200e of the sensing electrode 200. That is, the second reflection prevention part 420 may not make contact with the lateral side 200e of the sensing electrode 200, but may be spaced apart from the lateral side 200e of the sensing electrode 200 by a predetermined distance D.

The second reflection prevention part 420 may be bent toward the substrate 100 from the first reflection prevention part 410. That is, the second reflection prevention part 420 may be bent downward of the first reflection prevention part 410. Accordingly, an end 400e of the first buffer layer 400 may be disposed lower than a height 200aH of the top surface 200a of the sensing electrode 200. Accordingly, the second reflection prevention part 420 may surround the lateral side 200e of the sensing electrode 200. Accordingly, the second reflection prevention part 420 may reduce the reflectivity of the lateral side 200e of the sensing electrode 200 and may improve the visibility even at a wide viewing angle.

The first buffer layer 400 may include metal oxide, metal nitride, and metal oxynitride. Further, when the sensing electrode 200 includes first metal, the first buffer layer 400 may include oxide with the first metal. In addition, the first buffer layer 400 may include a darkening layer.

Due to the first buffer layer 400, the increase of visibility due to light reflected from the sensing electrode 200 including the metallic material can be prevented. Particularly, as described above, the first buffer layer 400 can reduce reflectivity of a lateral side of the sensing electrode 200 as well as the top surface of the sensing electrode so that the touch panel is advantageous in terms of visibility. In addition, the visibility can be improved even at a viewing angle. Therefore, optical characteristics of the sensing electrode 200 can be improved.

Figure 13:
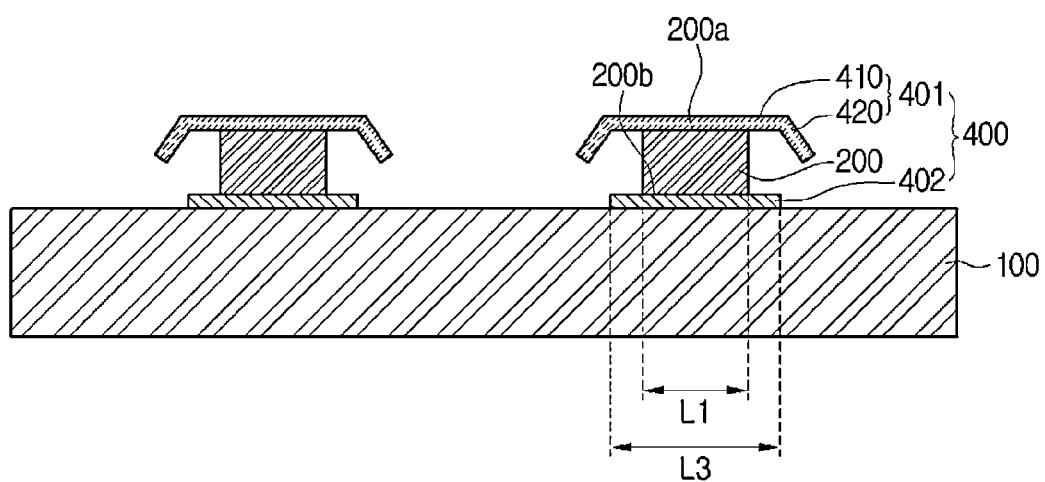
FIGS. 13 and 14 are sectional views showing a touch panel according to another embodiment.

Referring to FIG. 13, the touch panel according to another embodiment includes a first buffer layer 400, and the first buffer layer 400 includes a top buffer layer 401 and a bottom buffer layer 402.

The upper buffer layer 401 is disposed on a top surface 200a of the sensing electrode 200. The upper buffer layer is identical to or similar to the first buffer layer 400 included in the touch panel described above.

The bottom buffer layer 402 is disposed on a bottom surface 200b of the sensing electrode 200. A top surface of the bottom buffer layer 402 has an area wider than that of the bottom surface of the sensing electrode 200. Accordingly, the bottom buffer layer 402 may fully cover the bottom surface of the sensing electrode 200.

Further, a line width L3 of the bottom buffer layer 402 is greater than a line width L1 of the sensing electrode 200. That is, a length L3 of one section of the bottom buffer layer 402 is greater than a length L1 of one section of the sensing electrode 200. In detail, a ratio of the line width L1 of the sensing electrode 200 to the line width L3 of the bottom buffer layer 402 may be in the range of 1:1.1 to 1:1.3. When the ratio of the line width L1 of the sensing electrode 200 to the line width L3 of the bottom buffer layer 402 is less than 1:1.1, the bottom buffer layer 402 has a difficulty to sufficiently cover the bottom surface of the sensing electrode 200 so that the bottom buffer layer 402 may not serve as a prevent reflection layer. In addition, the ratio of the line width L1 of the sensing electrode 200 to the line width L3 of the bottom buffer layer 402 may not increase over 1:1.3 due to the limitation in the manufacturing process.

The bottom buffer layer 402 may prevent the visibility from being increased in an upper portion and a lower portion of the touch panel. Accordingly, the visibility over the whole area of the touch panel can be improved.

Figure 14:
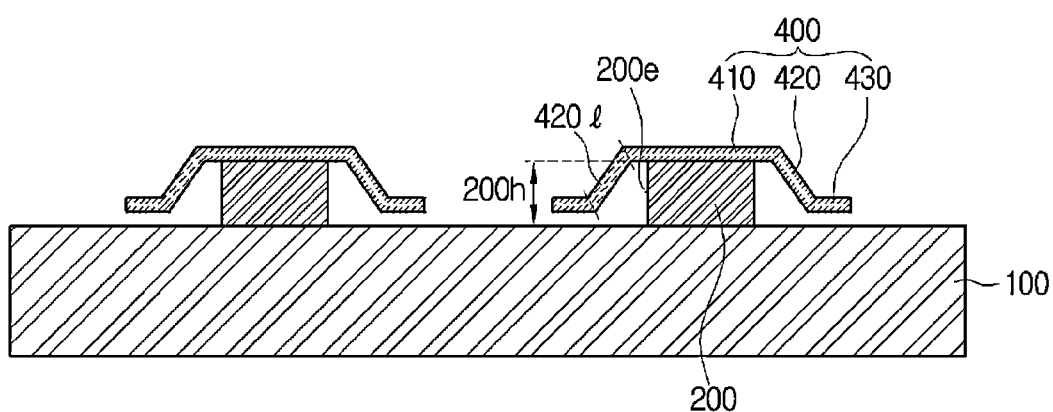

Meanwhile, referring to FIG. 14, the touch panel according to another embodiment includes a first buffer layer 400, and the first buffer layer 400 includes a first reflection prevention part 410, a second reflection prevention part 420, and a third reflection prevention part 430.

The first reflection prevention part 410 is disposed on the top surface of the sensing electrode 200.

The second reflection prevention part 420 is bent from the first reflection prevention part 410 and is disposed at a lateral side 200e of the sensing electrode 200. A length 420l of the second reflection prevention part 420 is greater than or at least equal to a height 200h of the sensing electrode 200. Accordingly, the second reflection prevention part 420 may fully cover the lateral side 200e of the sensing electrode 200.

The third reflection prevention part 430 extends from the second reflection prevention part 420 and is bent to be disposed at the lateral side 200e of the sensing electrode 200. The third reflection prevention part 430 may be spaced apart from the substrate 100.

Figure 15:
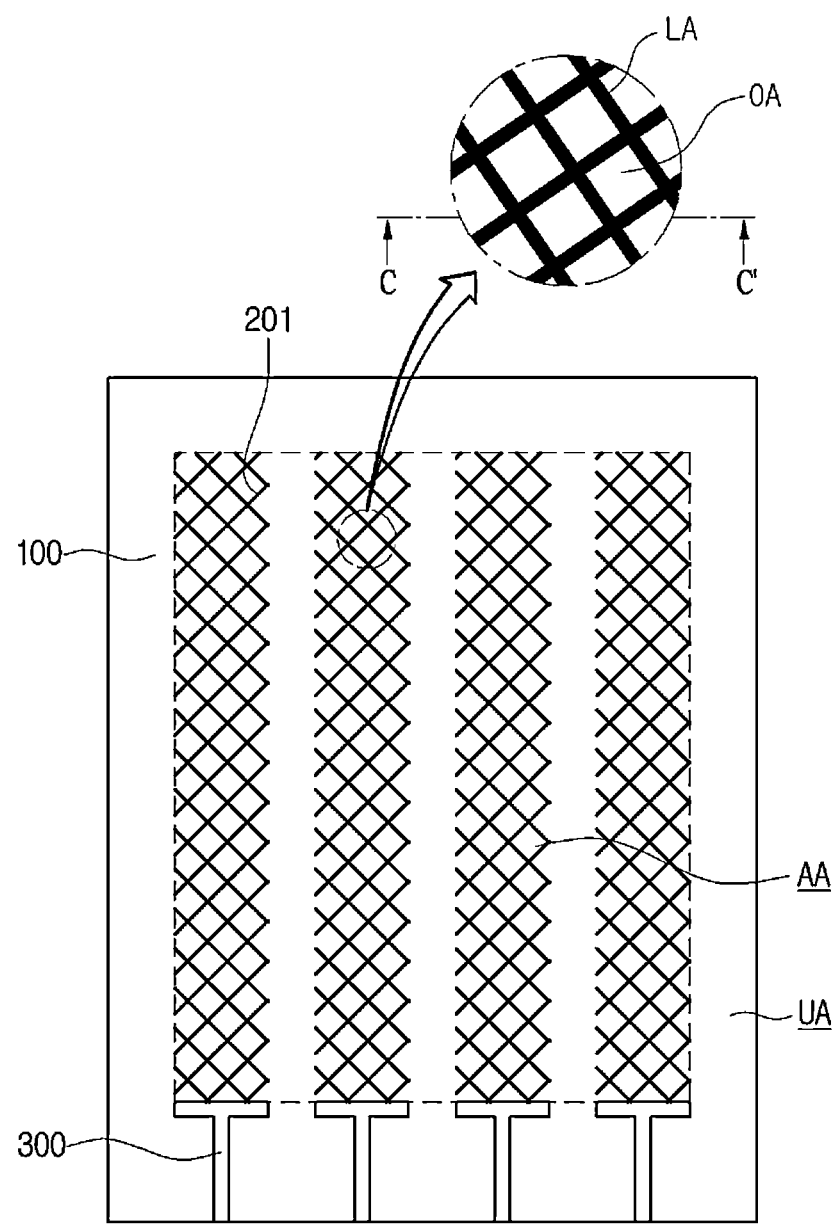
FIG. 15 is a plan view showing a touch panel according to another embodiment.
Figure 16:
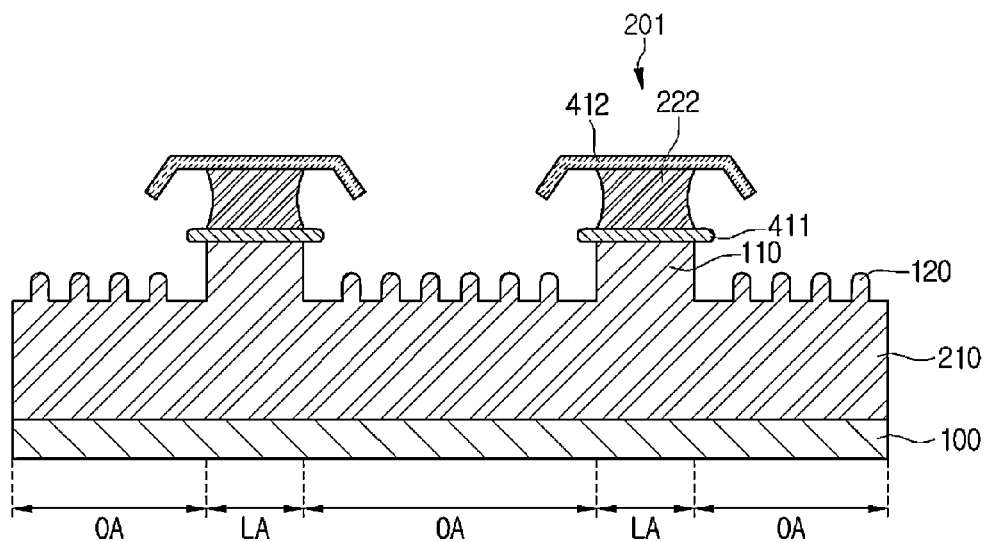
FIG. 16 is a sectional view taken along line C-C' of FIG. 15.

Referring to FIGS. 15 and 16, the touch panel according to another embodiment includes a sensing electrode 201, and the sensing electrode 201 may include a conductive pattern.

Referring to FIG. 16, the sensing electrode 201 may include a first sub-pattern 110, a second sub-pattern 120, an electrode layer 222, a top reflection prevention layer 412, and a bottom reflection prevention layer 412.

Meanwhile, the first sub-pattern 110 and the second sub-pattern 210 may be formed by imprinting the resin layer 210.

The first sub-pattern 110 is disposed on the substrate 100. The first sub-pattern 110 is disposed on the mesh line LA. Accordingly, the first sub-pattern 110 is arranged in the shape of a mesh. The first sub-pattern 110 may be convex form.

Meanwhile, the second sub-pattern 120 is disposed close to the first sub-pattern 110. The second sub-pattern 120 is disposed on the substrate 100. The second sub-pattern 120 is disposed on the mesh opening OA. Accordingly, the second sub-pattern 120 may be disposed between first sub-patterns 110. The second sub-pattern 120 may be convex form.

The first sub-pattern 110 and the second sub-pattern 120 may include resin and polymer.

The electrode layer 222 is disposed on the first sub-pattern 110. The electrode layer 222 is disposed at the mesh line LA, and is arranged in the shape of a mesh. The electrode layer 222 may include various metals having high electrical conductivity. For example, the electrode layer 222 may include Cu, Au, Ag, Al, Ti, Ni, or an alloy thereof.

A lateral side of the electrode layer 222 may be curved to an inner side of the sensing electrode 200. This shape is caused because the electrode layer 222 is formed by a deposition process and an etching process.

The top reflection prevention layer 412 is disposed on the first sub-pattern 110. The top reflection prevention layer 412 is disposed on a top surface of the electrode layer 222. The top reflection prevention layer 412 is disposed on the mesh line LA, and is arranged in the shape of a mesh.

The bottom reflection prevention layer 412 is disposed on the first sub-pattern 110. The bottom reflection prevention layer 412 is disposed on a bottom surface of the electrode layer 222. The bottom reflection prevention layer 412 is disposed on the mesh line LA, and is arranged in the shape of a mesh.

The top reflection prevention layer 412 and the bottom reflection prevention layer 412 may include at least one of metal oxide, metal nitride, and metal oxynitride. In this case, the top reflection prevention layer 412 and the bottom reflection prevention layer 412 may include mutually different materials, respectively. In detail, the top reflection prevention layer 412 and the bottom reflection prevention layer 412 include different materials so that the first buffer layer 223 and the electrode layer 222 may react with different etching solutions, respectively. That is, the top reflection prevention layer 412 and the bottom reflection prevention layer 412 may be selectively etched.

Hereinafter, the touch panel according to another embodiment will be described with reference to FIGS. 17 to 25.

Figure 17:
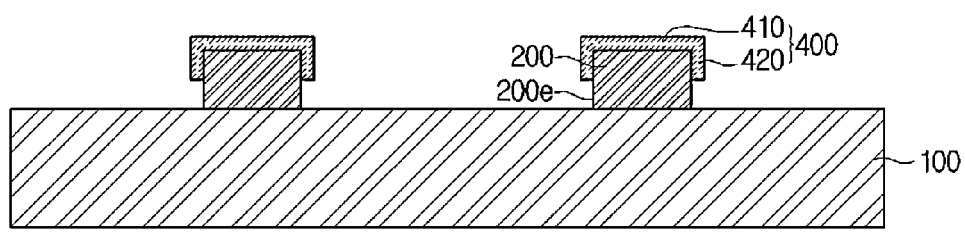
FIGS. 17 to 25 are sectional views showing a touch panel according to another embodiment.

First, referring to FIG. 17, the first buffer layer 400 includes a first reflection prevention part 410 and a second reflection prevention part 420. The second reflection prevention part 420 is disposed at a lateral side of the sensing electrode 200. In this case, the second reflection prevention part 420 may directly make contact with the lateral side 200e of the sensing electrode 200. The second reflection prevention part 420 may directly make contact with a part of the lateral side 200e of the sensing electrode 200.

Figure 18:
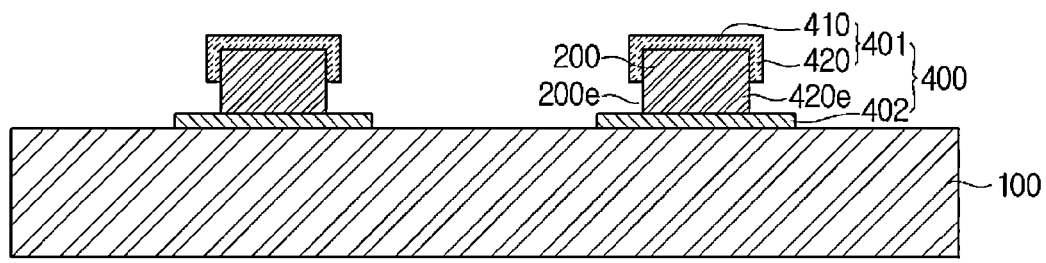

Referring to FIG. 18, the first buffer layer 400 includes a top buffer layer 401 and a bottom buffer layer 402. In this case, the top buffer layer 401 includes a first reflection prevention part 410 and a second reflection prevention part 420, and the second reflection prevention part 420 is disposed at the lateral side 200e of the sensing electrode 200. In this case, the second reflection prevention part 420 may directly make contact with the lateral side 200e of the sensing electrode 200. The second reflection prevention part 420 may directly make contact with a part of the lateral side 200e of the sensing electrode 200.

Figure 19:
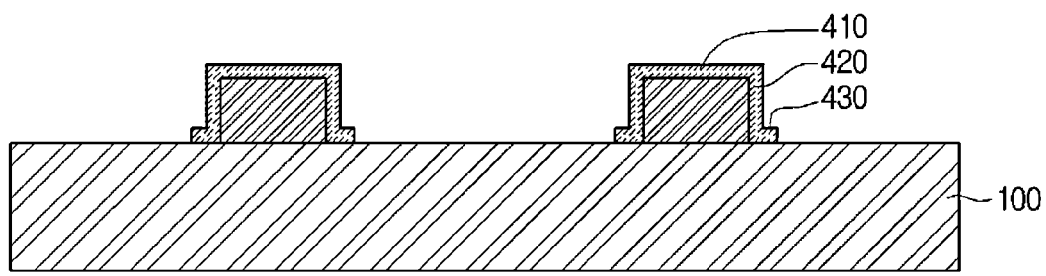

Referring to FIG. 19, the first buffer layer 400 includes a first reflection prevention part 410, a second reflection prevention part 420, and a third reflection prevention part 430, and the third reflection prevention part 430 is disposed on a top surface of the substrate 100. In this case, the third reflection prevention part 430 may directly make contact with the top surface of the substrate 100.

Figure 20:
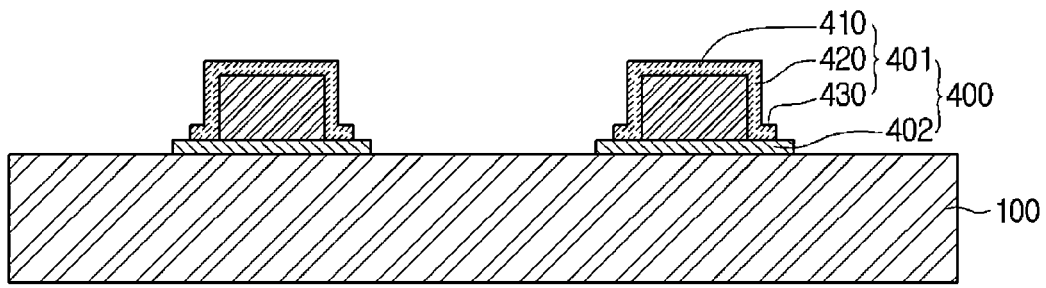

Referring to FIG. 20, the first buffer layer 400 includes a top buffer layer 401 and a bottom buffer layer 402. In this case, the top buffer layer 401 includes a first reflection prevention part 410, a second reflection prevention part 420, and a third reflection prevention part 430, and the third reflection prevention part 430 is disposed on the bottom buffer layer 402. In this case, the third reflection prevention part 430 may directly make contact with the top surface of the bottom buffer layer 402.

Figure 21:
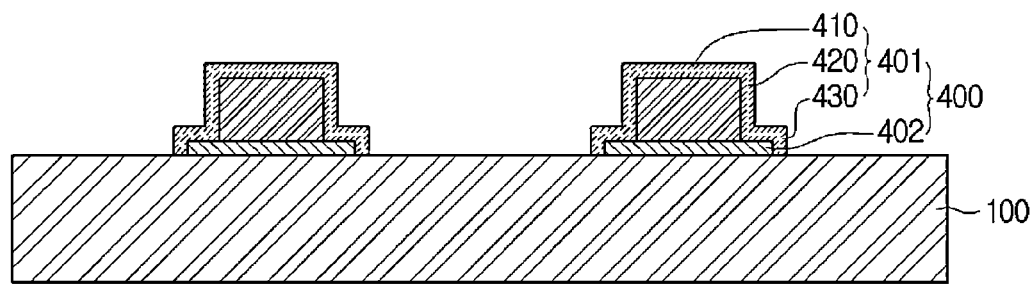

Referring to FIG. 21, the third reflection prevention part 430 may be disposed at a top surface and a lateral side of the bottom buffer layer 402. That is, the third reflection prevention part 430 may surround the bottom buffer layer 402.

Figure 22:
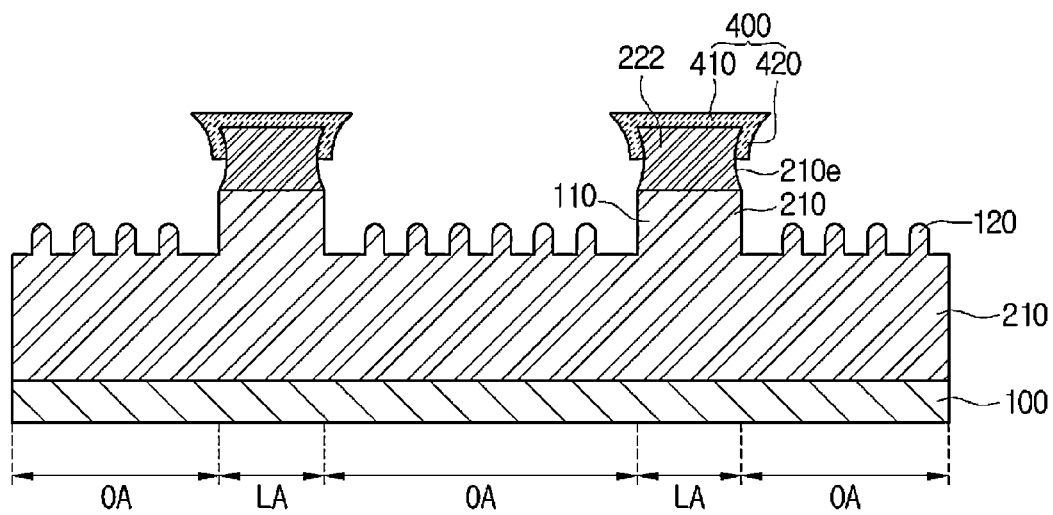

Referring to FIG. 22, an electrode layer 222 and a first buffer layer 400 are disposed on the first sub-pattern 110, and the first buffer layer 400 includes a first reflection prevention part 410 and a second reflection prevention part 420. The second reflection prevention part 420 is disposed at a lateral side 222e of the electrode layer 222. In this case, the second reflection prevention part 420 may directly make contact with the lateral side of the electrode layer 222. The second reflection prevention part 420 may directly make contact with a part of the lateral side of the electrode layer 222.

Figure 12:
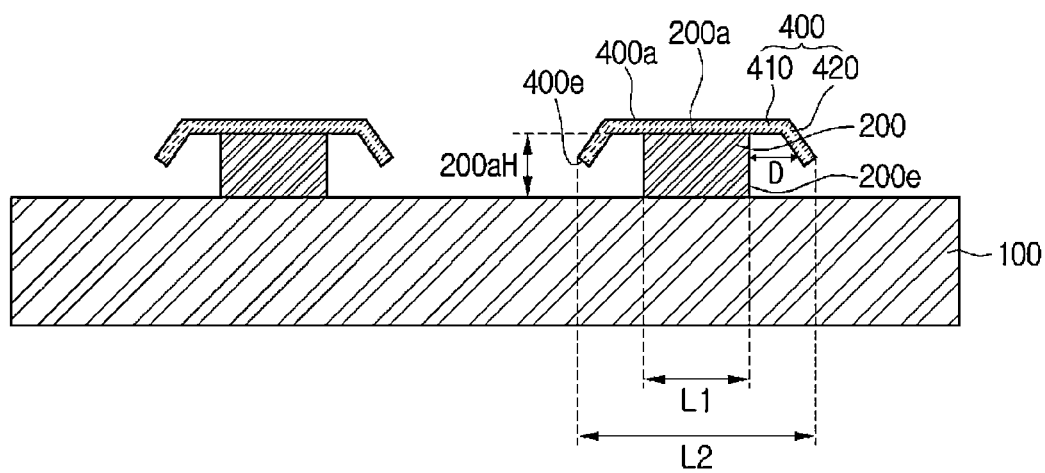
FIG. 12 is a sectional view taken along line B-B' of FIG. 12.
Figure 23:
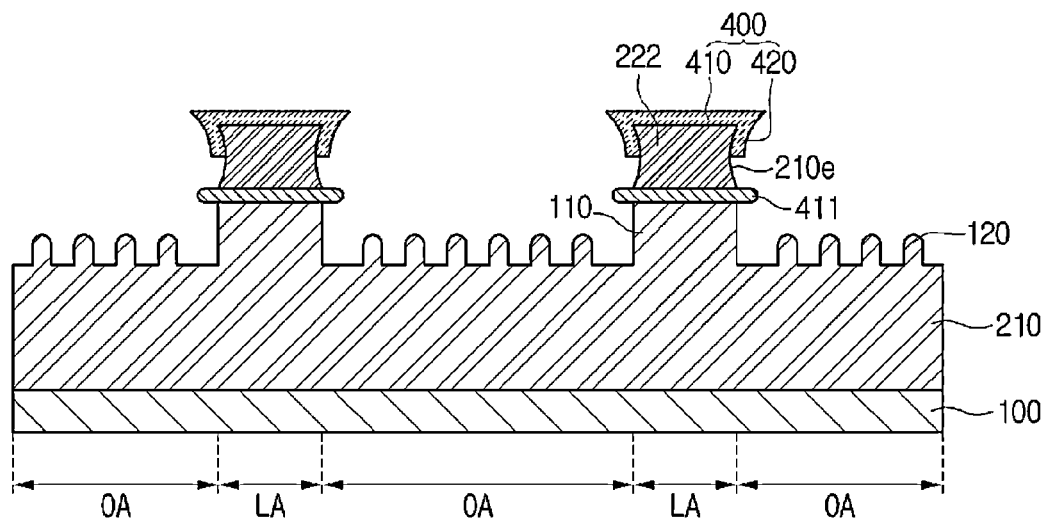

Referring to FIG. 23, a bottom reflection prevention layer 412 which is disposed at a bottom surface of the electrode layer 222 may be further included in a structure of the touch panel as illustrated in FIG. 12.

Figure 24:
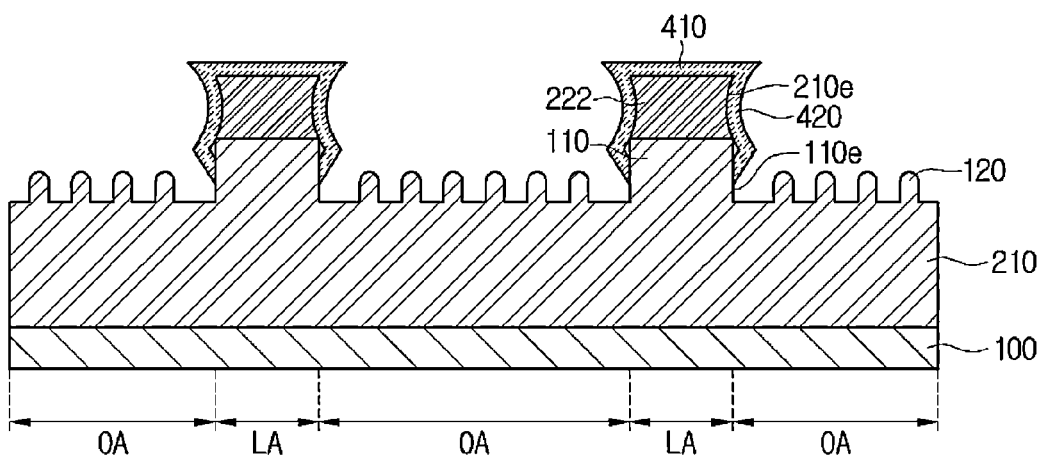

Referring to FIG. 24, the second reflection prevention part 420 may be disposed along a lateral side of the electrode layer 222 and a lateral side 110e of the first sub-pattern 110. The second reflection prevention part 420 may directly make contact with the lateral side 222e of the electrode layer 222 and the lateral side 110e of the first sub-pattern 110.

Figure 25:
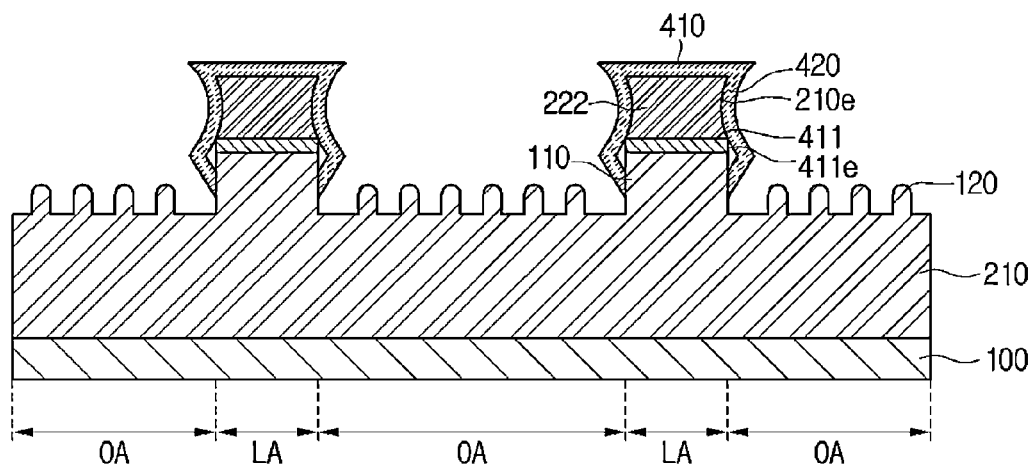

Referring to FIG. 25, Referring to FIG. 23, a bottom reflection prevention layer 412 which is disposed at a bottom surface of an electrode layer 222 may be further included in a structure of the touch panel as illustrated in FIG. 14. The bottom reflection prevention layer 412 may be disposed along the lateral side 222e of the electrode layer 222, the lateral side 412e of the bottom reflection prevention layer 412, and the lateral side 110e of the first sub-pattern 110. The bottom reflection prevention layer 412 may directly make contact with the lateral side 222e of the electrode layer 222, the lateral side 412e of the lateral side 412e of the bottom reflection prevention layer 412, and the lateral side 110e of the first sub-pattern 110.

Hereinafter, a method of manufacturing a touch panel according to the embodiment will be described with reference to FIGS. 26 to 32.

FIGS. 26 to 32 are sectional views showing a method for manufacturing the touch panel according to the embodiment. However, the embodiment is not limited thereto. The touch panel according to another embodiment may be manufactured in the same method or similar method.

Figure 26:
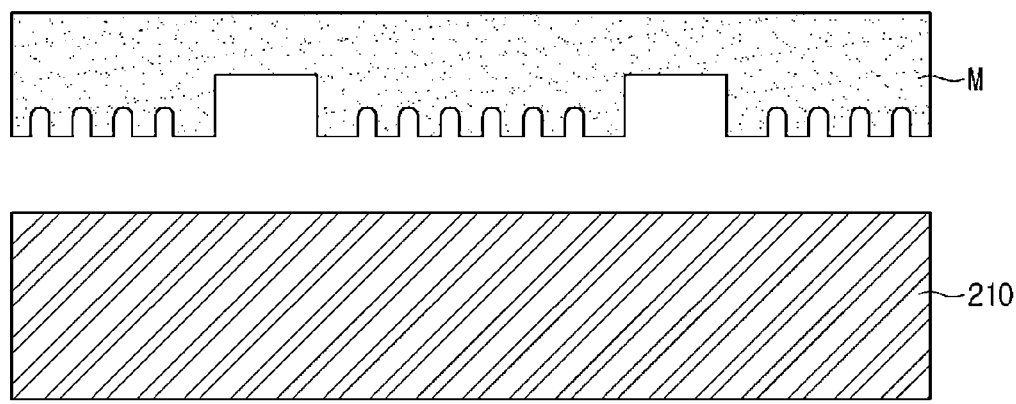
FIGS. 26 to 32 are sectional views showing a method of manufacturing the touch panel according to the embodiment.
Figure 27:
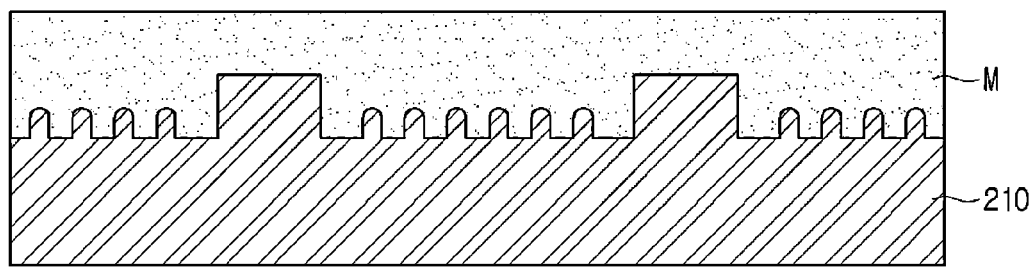

First, referring to FIGS. 26 and 27, a mold M on which a desired pattern is formed may be disposed and imprinted on a resin layer 210.

Figure 28:
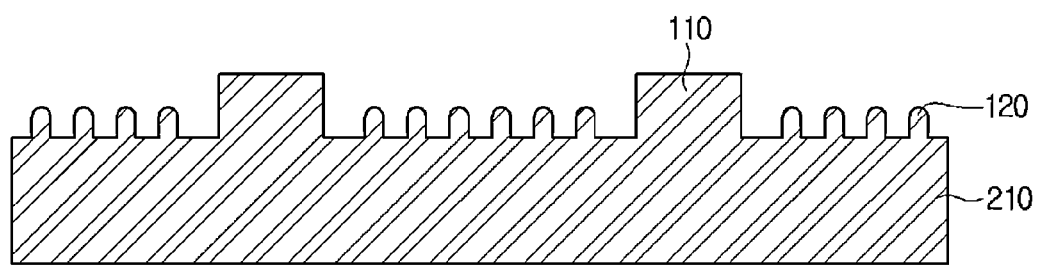

Referring to FIG. 28, the resin layer 210 with the first sub-pattern 110 and the second sub-pattern 120 may be manufactured through the imprinting process.

Figure 29:
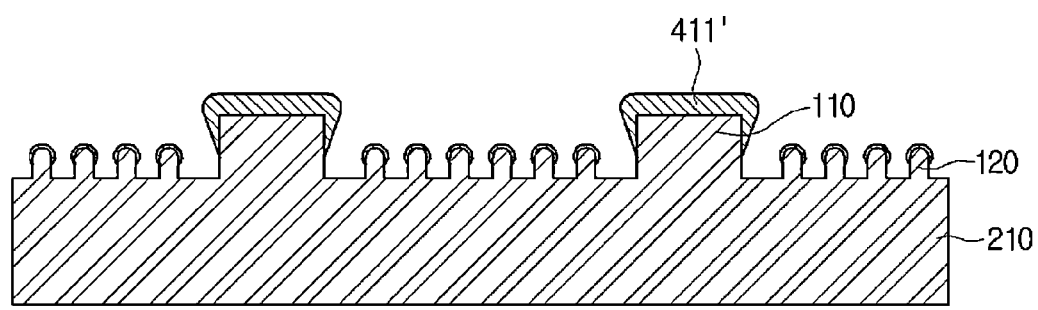

Referring to FIG. 29, a bottom reflection prevention layer material 412' may be formed on the first sub-pattern 110 and the second sub-pattern 120. The bottom reflection prevention layer material 412' may be formed by a deposition process.

Figure 30:
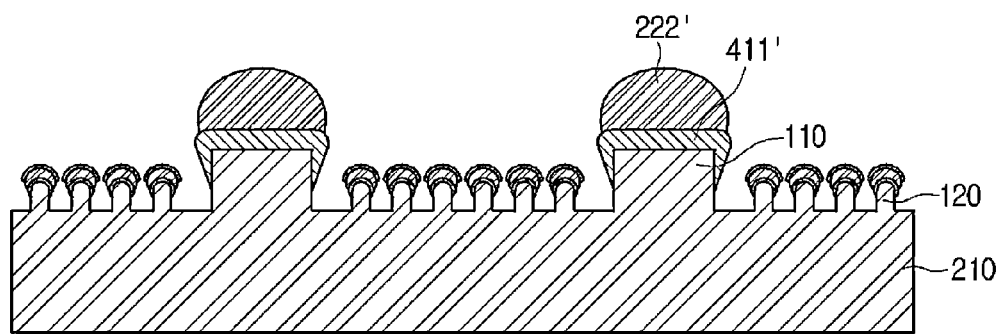

Referring to FIG. 30, an electrode material 222' may be formed on the bottom reflection prevention layer material 412'. The electrode material 222' may be formed through the deposition process.

Figure 31:
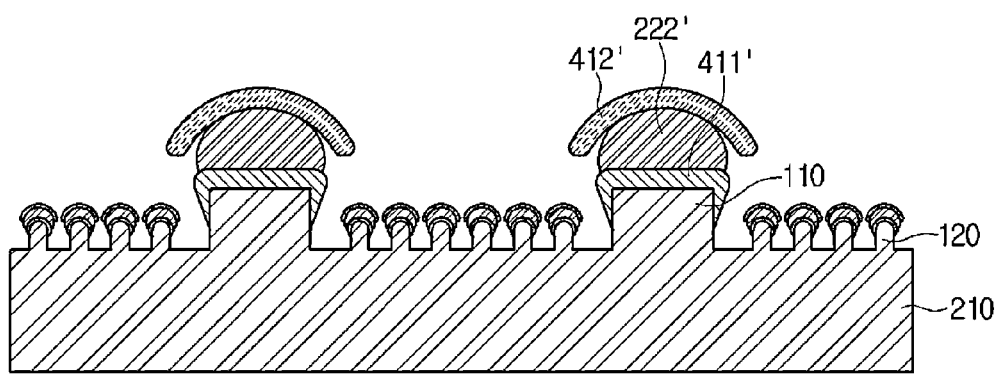

Referring to FIG. 31, a top reflection prevention layer material 412' may be formed on the electrode material 222'. The top reflection prevention layer material 412' may be formed by the deposition process.

Figure 32:
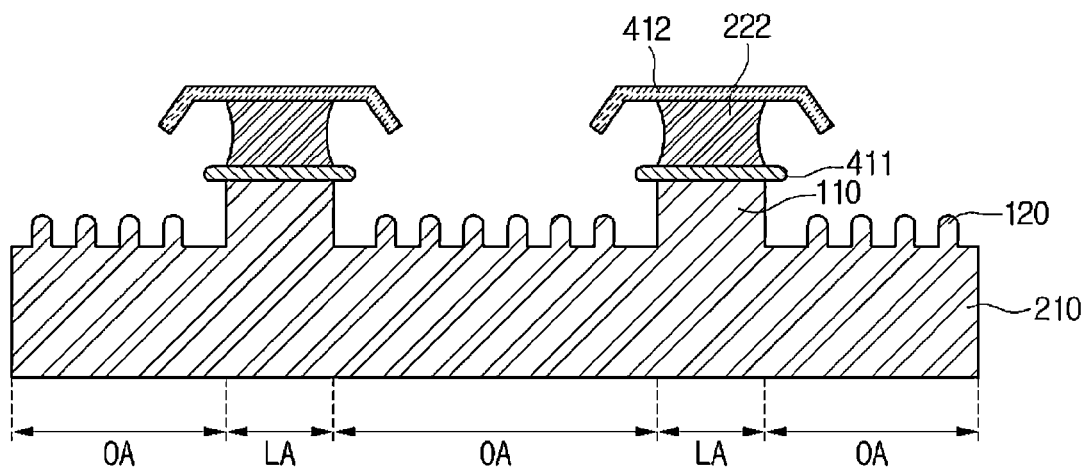

Referring to FIGS. 31 and 32, the bottom reflection prevention layer material 412' and the electrode material 222' may be etched. In this case, the bottom reflection prevention layer material 412' and the electrode material 222' may be etched by one process. That is, the bottom reflection prevention layer material 412' and the electrode material 222' may be etched by one etching solution. In this case, the etching solution may not etch the top reflection prevention layer material 412'. That is, the top reflection prevention layer material 412' may include a material that may react with an etching solution different from the etching solution for the bottom reflection prevention layer material 412' and the electrode material 222' so that the selective etching may be performed.

An etch area may vary depending on structures of the first sub-pattern 110 and the second sub-pattern 120 and a contact area with respect to the electrode material 222'. That is, since a contact area between the first sub-pattern 110 and the electrode material 222' is larger than a contact area between the second sub-pattern 120 and the electrode material 222', the electrode material 222' formed on the first sub-pattern 110 is less etched. That is, the electrode material 222' remains on the first sub-pattern 110 and the electrode material 222' formed on the second sub-pattern 120 is etched and removed under the same etching rate. As a result, the top reflection prevention layer material 412' and the bottom reflection prevention layer material 412' formed on the second sub-pattern 120 may be lifted-off and removed. Accordingly, the bottom reflection prevention layer 412, an electrode layer 222, and the top reflection prevent layer 412 may be formed only on the first sub-pattern 110, and the electrode layer 222 may be arranged in the shape of a mesh. Further, as described above, since the top reflection prevention layer material 412' is not etched, a line width of the top reflection prevention layer 412 may be greater than a line with of the electrode layer 222 or the bottom reflection prevention layer 412.

Figure 33:
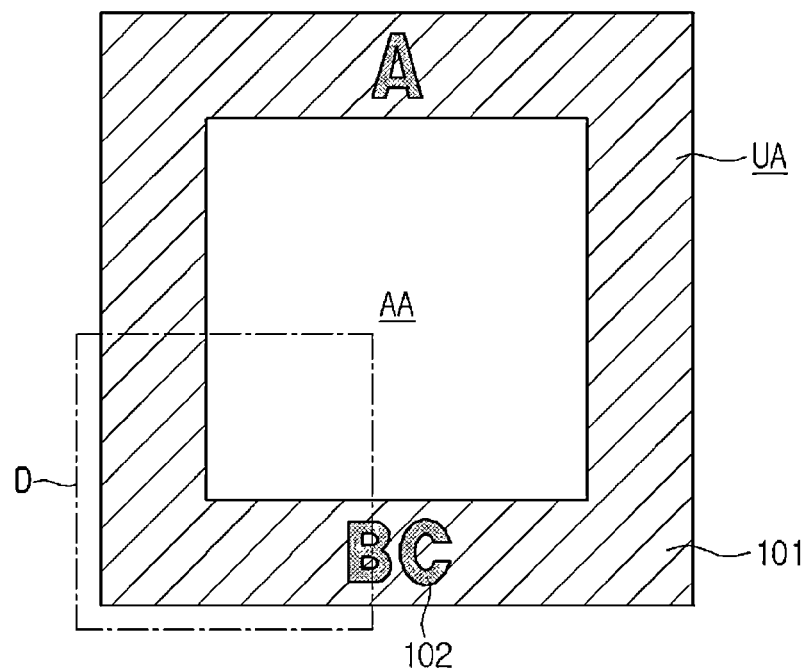
FIG. 33 is a plan view showing a touch panel according to another embodiment.
Figure 34:
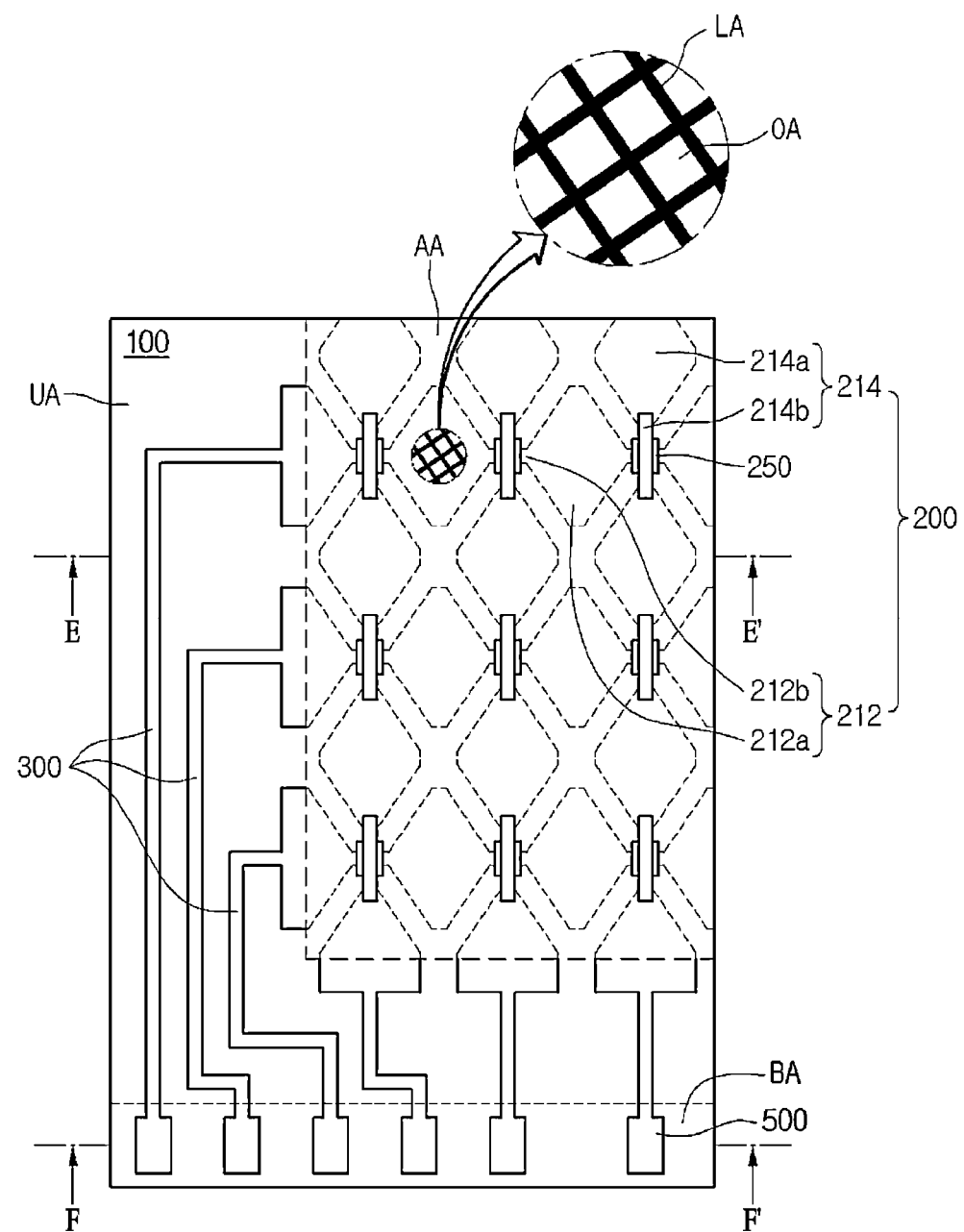
FIG. 34 is an enlarged view showing a part D of FIG. 33.

Referring to FIGS. 33 and 34, in this case, the active area AA may be provided therein with sensing electrodes 200 that may sense the input device. In addition, the unactive area UA may be provided therein with wires 300 electrically connecting the sensing electrodes 200 to each other. Further, the unactive area UA may be provided therein with an external circuit connected to the wires 300. The outer dummy layer is formed in the unactive area UA and a logo 102 may be formed in the outer dummy layer 101.

Referring to FIG. 34, the sensing electrode 200 includes a first electrode 212 and a second electrode 214. The first electrode 212 and the second electrode 214 may be aligned on the same plane with the substrate 100.

Since the first electrode 212 and the second electrode 214 are aligned on the same plane, the thickness of the touch panel can be reduced and the visibility thereof can be improved. That is, when the first electrode 212 and the second electrode 214 are disposed on different electrode bases, respectively, the thickness of the touch panel can be increased, and when viewed from the top, a conductive pattern of the first electrode 212 and a conductive pattern of the second electrode 214 are overlapped with each other so that a Moire phenomenon may occur. However, the embodiment can prevent the Moire phenomenon by aligning the first electrode and the second electrode on one plane.

The first electrode part 212 includes a plurality of first sensor parts 212a to detect whether the input device such as the finger is touched, and first connection electrode parts 212b to connect the first sensor parts 212a to each other. The first connection electrode parts 212b connect the first sensor parts 212a to each other in a first direction (X-axis direction in the drawings), so that the first electrode part 212 may extend in the first direction.

Similarly, the second electrode part 214 includes a plurality of second sensor parts 214a to detect whether the input device such as the finger is touched, and second connection electrode parts 214b to connect the second sensor parts 214a to each other. The second connection electrode parts 214b connect the second sensor parts 214a to each other in a second direction (Y-axis direction in accompanying drawings), so that the second electrode part 214 may extend in the second direction.

An insulating layer 250 may be located between the first and second connection electrode parts 212b and 214b in order to prevent the electrical short therebetween. The insulating layer 250 may include a transparent insulating material to insulate the first electrode part 212 from the second electrode part 214.

Meanwhile, the sensing electrode 200 may include the conductive pattern. That is, the sensing electrode 200 is arranged in the shape of a mesh. In this case, a line width of the mesh line LA may be in the range of 1 nm to 1 µm. A mesh line LA of 1 nm or less may not be formed due to the characteristic of the manufacturing process. If the line width is 1 µm or less, the pattern of the sensing electrode 200 may not be viewed. Preferably, the line width of the mesh line LA may be in the range of 50 nm to 1 µm. The sensing electrode 200 has a micro-line width so that the visibility of the touch panel can be improved.

A ratio of a line width/thickness of the sensing electrode 200 may vary according to sheet resistance and the total size of patterns of the sensing electrode 200. For example, the ratio of the line width/thickness of the sensing electrode 200 may be in the range of 0.05 to 1. When the ratio of the line width/thickness of the sensing electrode 200 is less than 0.05, the sheet resistance may be increased. When the ratio of the line width/thickness of the sensing electrode 200 exceeds 1, the pattern of the sensing electrode 200 may be viewed.

Figure 35:
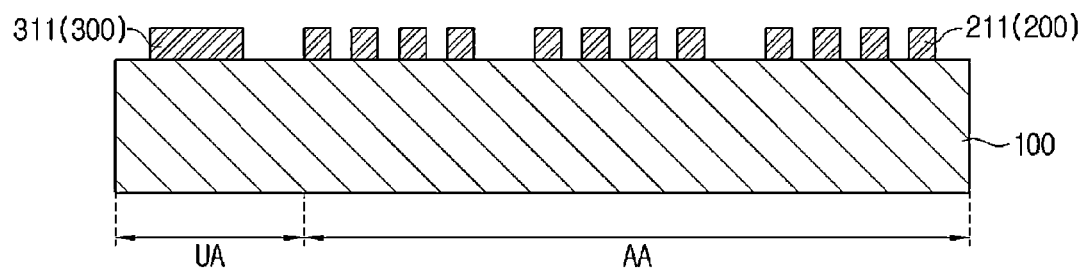
FIG. 35 is a sectional view taken along line E-E' of FIG. 35.

Referring to FIG. 35, the sensing electrode 200 includes an electrode layer 211. The electrode layer 211 may include a conductive material. For example, the electrode layer 211 may include conductive metal. In detail, the electrode layer 211 may include Al, Cu, and Ag having high conductivity. Further, the electrode layer 211 may include one of graphene, a nano-wire, and a mixture thereof. The electrode layer 211 is arranged in the shape of a mesh.

Meanwhile, the wire 300 may be formed in the active area AA not to be viewed. The wire 300 includes a first wire layer 311. The first wire layer 311 may include a conductive material. For example, the first wire layer 311 may include conductive metal. For example, the first wire layer 311 may include the same material as that of the electrode layer 211.

Figure 36:
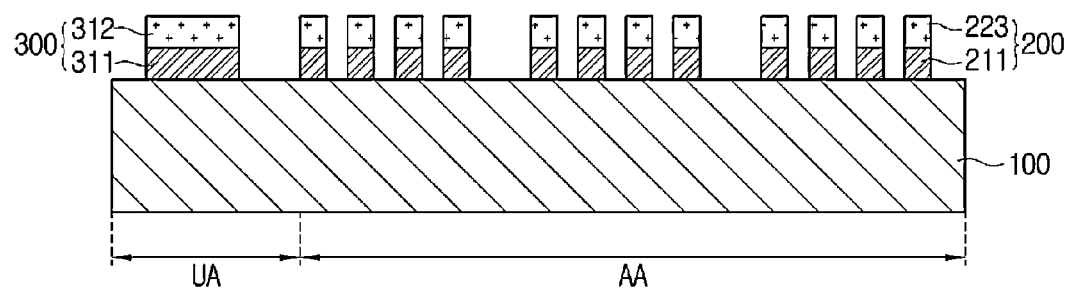
FIGS. 36 and 37 are sectional views showing a touch panel according to another embodiment.

Meanwhile, referring to FIG. 36, the sensing electrode 200 according to another embodiment may include an electrode layer 211 and a first buffer layer 223. The electrode layer 211 may be disposed on the substrate 100, and the first buffer layer 223 may be disposed on the electrode layer 211. Since the electrode layer 211 is arranged in the shape of a mesh, the first buffer layer 223 may be also arranged in the shape of a mesh. The first buffer layer 223 may include UV resin or photoresist.

Similarly, the wire 300 may include a first wire layer 311 and a first buffer layer 312. The first wire layer 311 may be arranged on the substrate 100, and the first buffer layer 312 may be arranged on the first wire layer 311. The first buffer layer 312 may include UV resin or photoresist.

Figure 37:
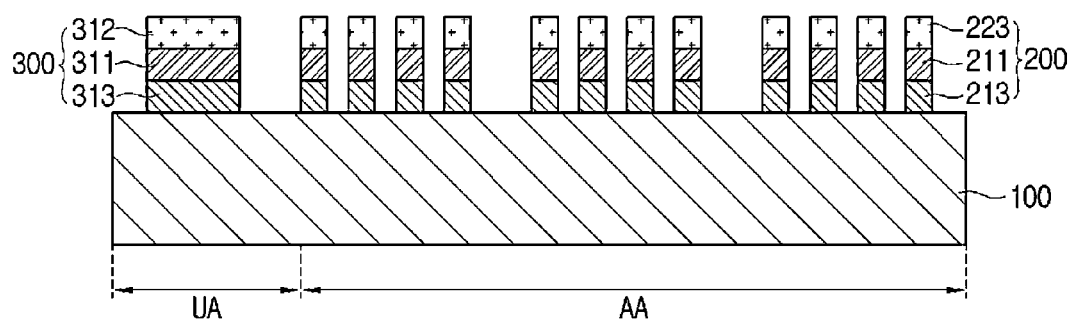

Meanwhile, the sensing electrode 22 and the wire 300 may have a structure as illustrated in FIG. 37. Referring to FIG. 37, the sensing electrode 200 may include a conductive layer 213, an electrode layer 211, and the first buffer layer 223. The conductive layer 213 may be arranged on the substrate 100, and the electrode layer 211 and the first buffer layer 223 may be sequentially arranged on the conductive layer 213. That is, the conductive layer 213 may be arranged between the substrate 100 and the electrode layer 211. Accordingly, the conductive layer 213 may protect the substrate 100. That is, when the electrode layer 211 is formed on the substrate 100, damage may be applied to the substrate 100. The damage may be prevented through the conductive layer 213. The conductive layer 213 may include indium tin oxide (ITO), indium zinc oxide (IZO), or conductive metal.

Similarly, the wire 300 may include a conductive layer 313, a first wire layer 311, and a first wire layer 312. The conductive layer 313 may be disposed on the substrate 100, and the first wire layer 311 and the first buffer layer 312 may be sequentially disposed on the conductive layer 313.

Although not shown in drawings, the touch panel according to the embodiment may further include a structure where the first buffer layer 223 is omitted from a structure of FIG. 37.

Meanwhile, referring to FIG. 34, the unactive area UA includes a bonding area BA. The wire 300 and a circuit board are bonded to each other at the bonding area BA. In detail, a pad 500 is arranged at an end of the wire 300 and the pad 500 is bonded to the circuit board so that the wire 300 may be electrically connected to the circuit board.

Figure 38:
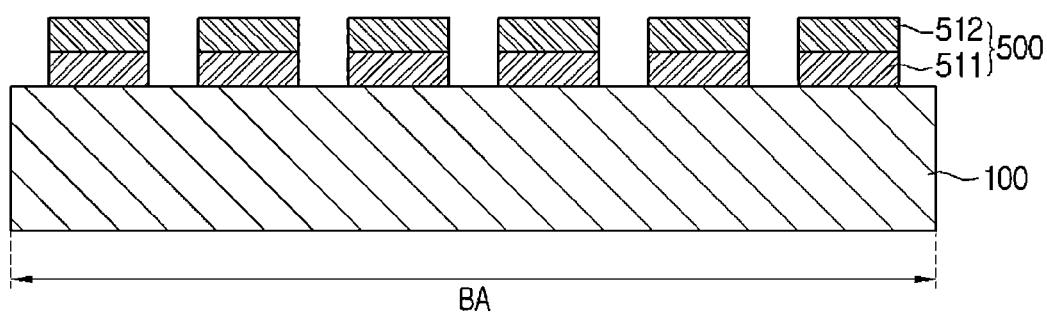
FIG. 38 is a sectional view taken along line F-F' of FIG. 34.

Referring to FIG. 38, the pad 500 may include a first pad layer 511 and a second pad layer 512. The first pad layer 511 is arranged on the substrate 100. The first pad layer 511 may include a conductive material. For example, the first pad layer 511 may include conductive metal. The first pad layer 511 may include the same material as that of the electrode layer 211 or the first wire layer 311.

The second pad layer 512 is arranged on the first pad layer 511. The second pad layer 512 may include conductive metal. Preferably, the second pad layer 512 may include silver (Ag). The second pad layer 512 may directly make contact with the circuit board.

Various types of printed circuit boards may be used as the printed circuit board. For instance, a flexible printed circuit board (FPCB) may be used as the printed circuit board.

Figure 39:
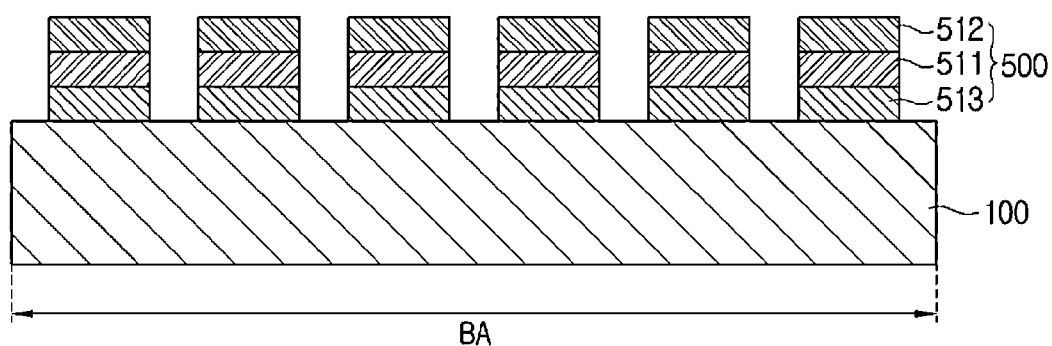
FIG. 39 is a sectional view showing a touch panel according to another embodiment.

Meanwhile, the pad 500 may have a structure as illustrated in FIG. 39. Referring to FIG. 39, the pad 500 may include a conductive layer 513, a first pad layer 511, and a second pad layer 512. The conductive layer 513 may be arranged on the substrate 100, and the first pad layer 511 and the second pad layer 512 may be sequentially arranged on the conductive layer 513. That is, the conductive layer 513 may be arranged between the substrate 100 and the first pad layer 511. Accordingly, the conductive layer 513 may protect the substrate 100. That is, when the first pad layer 511 is formed on the substrate 100, damage may be applied to the substrate 100. The damage may be prevented through the conductive layer 513. The conductive layer 513 may include indium tin oxide (ITO), indium zinc oxide (IZO), or conductive metal.

Hereinafter, the method of manufacturing the touch panel according to the embodiment will be described with reference to FIGS. 40 to 55.

First, the method of manufacturing a sensing electrode 200 and a wire 300 of the touch panel according to the embodiment will be described with reference to FIGS. 40 to 45.

Figure 40:
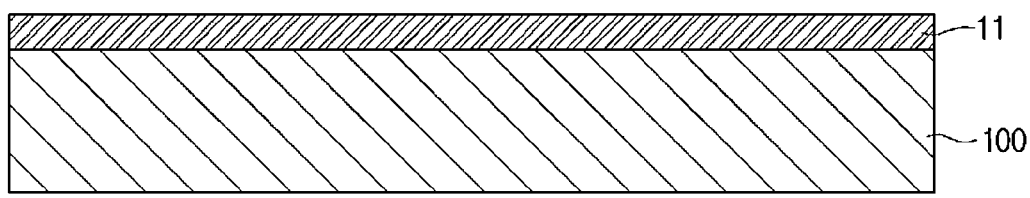
FIGS. 40 to 56 are sectional views showing a method of manufacturing the touch panel according to the embodiment.

Referring to FIG. 40, a first metallic material 11 may be formed on a substrate 100. The first metallic material 11 may include conductive metal, and may be formed by a deposition process. In detail, the first metallic material 11 may be formed by a sputtering process.

Figure 41:
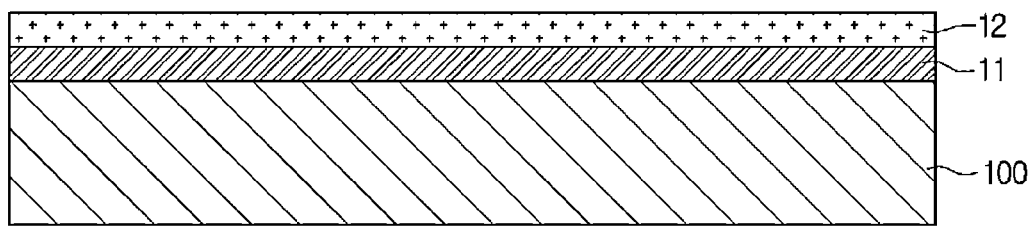

Referring to FIG. 41, a first buffer layer 12 may be formed on the first metallic material 11. The first buffer layer 12 may formed by coating UV resin or photoresist.

Figure 42:
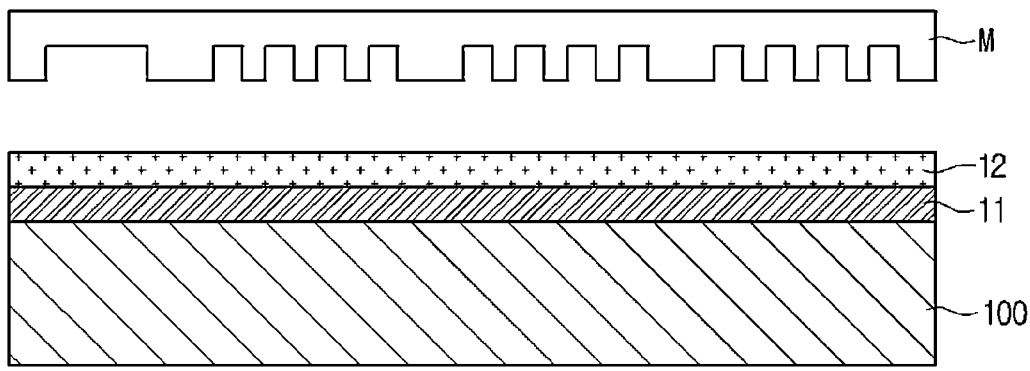

Referring to FIG. 42, the first buffer layer 12 may be imprinted. In detail, the first buffer layer 12 may be directly imprinted. That is, the imprinting may be performed after an imprinting mold M has been disposed on the first buffer layer 12. The imprinting mold M has a pattern opposite to a pattern to be formed on the first buffer layer 12.

Figure 43:
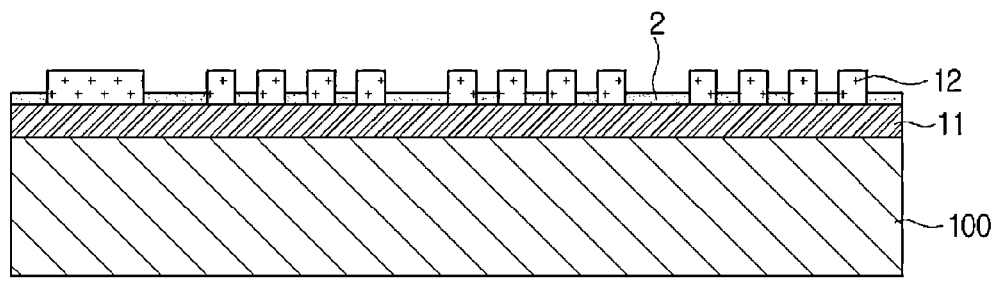
Figure 44:
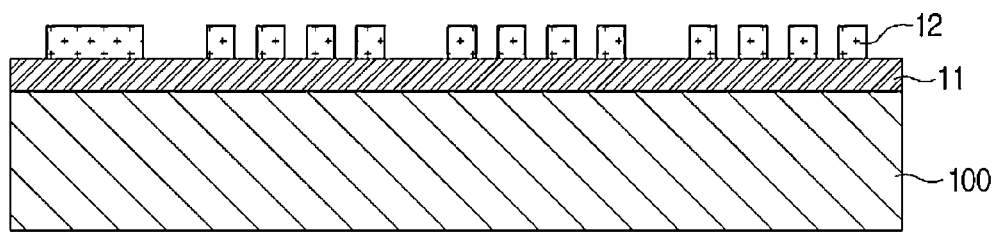

Referring to FIG. 43, after the imprinting process, the first buffer layer 2 may remain in the first buffer layers 12 formed with the pattern. Accordingly, a process of removing the remaining first buffer layer 2 may be performed. The remaining first buffer layer 2 may be removed through a plasma process. In detail, the remaining first buffer layer 2 may be removed through an oxygen ($O_2$) plasma process.

Accordingly, only the first buffer layer 12 formed with the pattern remains as illustrated in FIG. 43. Next, the first metallic material 11 may be patterned using the first buffer layer 12 on which the pattern is formed as a mask. The first metallic material 11 may be patterned through an etching process such as wet etching or dry etching.

Figure 45:
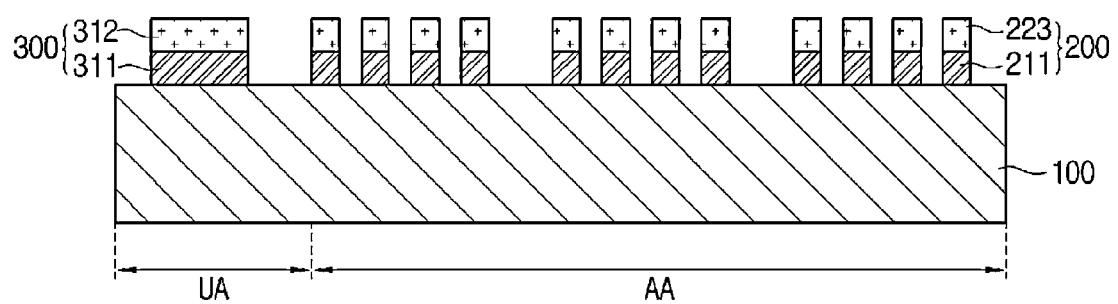

Accordingly, referring to FIG. 45, sensing electrodes 200 having the shape of a mesh are formed in the active area AA, and a wire 300 to connect the sensing electrodes 200 to each other is formed in the unactive are UA.

Next, a step of removing the first buffer layer 223 may be added.

In the method of manufacturing the touch panel according to the embodiment, the sensing electrode 200 may be patterned in the shape of a mesh using one imprinting mold M. That is, the embodiment can solve the problem of the related art where the mesh shape is formed through the imprinting so that at least two expensive molds such as a mother mold and a son mold are required, thereby increasing the cost and complicating the process. Accordingly, the cost can be reduced and mass production can be increased by simplifying the process.

In addition, in the method of manufacturing the touch panel according to the embodiment, a nano base pattern as well as the mesh pattern may be omitted. That is, the embodiment can solve the problem of the related art where a nano base pattern is separately required between mesh patterns when the mesh shape is formed through the imprinting so that the process is complicated.

Further, a micro-line width of 1 μm or less may be realized by the imprinting.

Hereinafter, a method of manufacturing the touch panel according to another embodiment will be described with reference to FIGS. 46 to 52.

Figure 46:
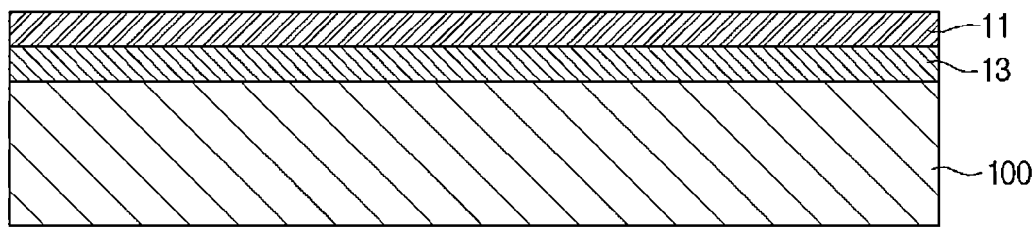

Referring to FIG. 46, a conductive material 13 may be firstly formed on a substrate 100. The conductive material 13 may include indium tin oxide (ITO), indium zinc oxide (IZO), or conductive metal. The conductive material 13 may be formed by a deposition process. After that, the first metallic material 11 may be formed on the conductive material 13.

Figure 47:
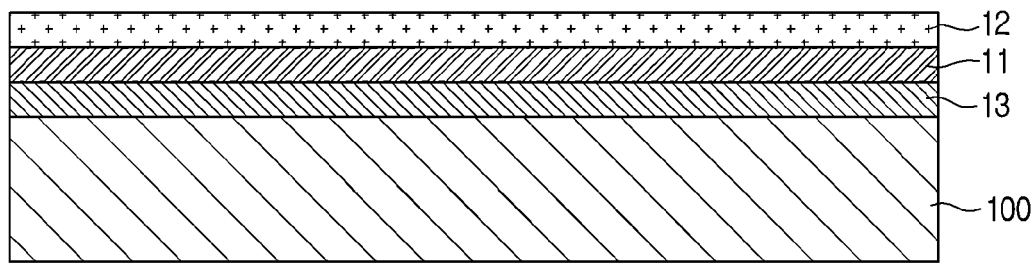

Referring to FIG. 47, the first buffer layer 12 may be formed on the first metallic material 11.

Figure 48:
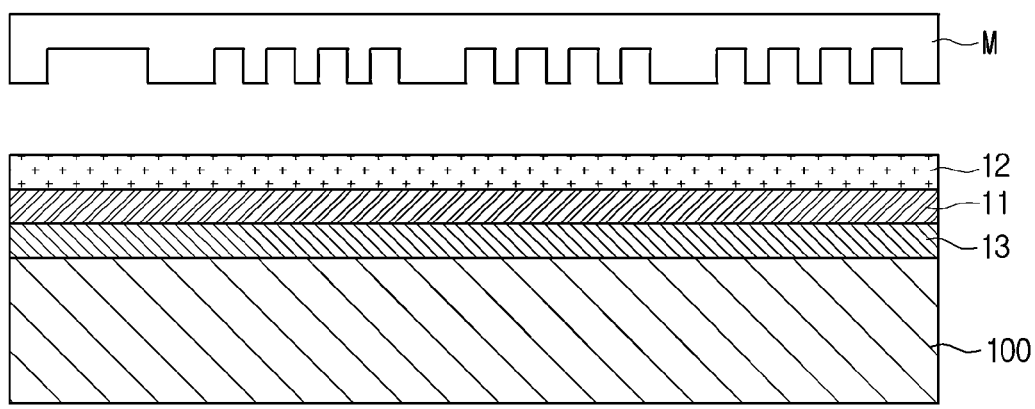

Referring to FIG. 48, the first buffer layer 12 may be imprinted using the imprinting mold M.

Figure 49:
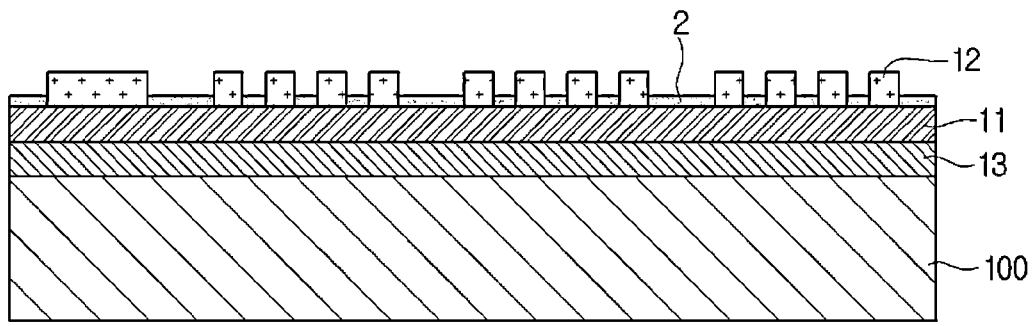

Referring to FIG. 49, the first buffer layer 2 may remain in the first buffer layer 12 on which a pattern is formed, and the remaining first buffer layer 2 may be removed.

Figure 50:
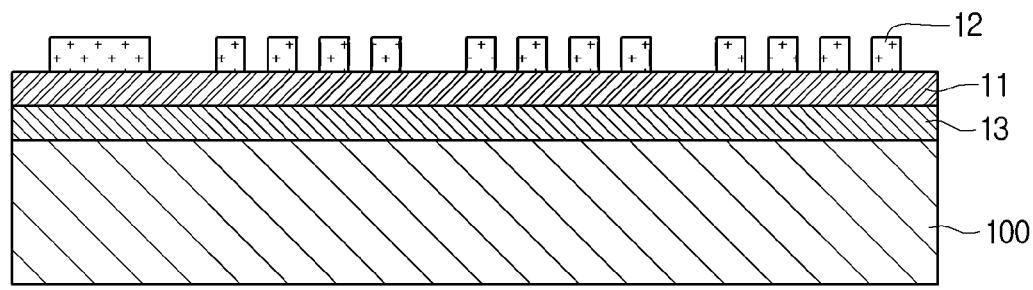
Figure 51:
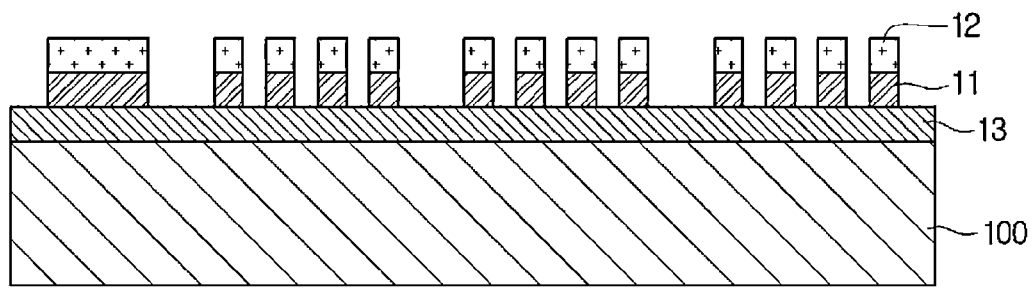

Accordingly, only the first buffer layer 12 on which the pattern is formed remains as illustrated in FIG. 50.

Next, the first metallic material 11 may be patterned using the first buffer layer 12 on which the pattern is formed as a mask.

In this case, since the conductive material 13 is disposed on the substrate 100, when performing a process of removing the remaining first buffer layer 2 or patterning the first metallic material 11, the damage applied to the substrate 100 may be minimized. In detail, when a process of removing the remaining first buffer layer 2 is performed, if oxygen plasma is strong, the first metallic material 11 may be partially removed. Thus, the substrate 100 may be damaged. Accordingly, the substrate 100 may be protected through the conductive material 13. In particular, when the substrate 100 includes film, the efficiency is improved.

Figure 52:
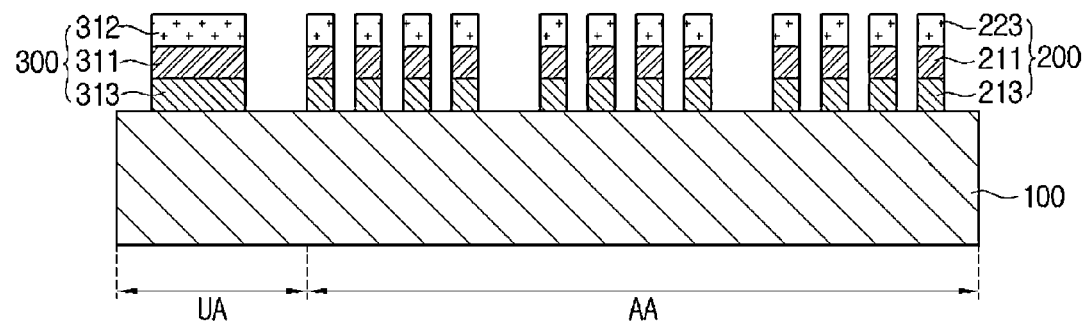
Figure 53:
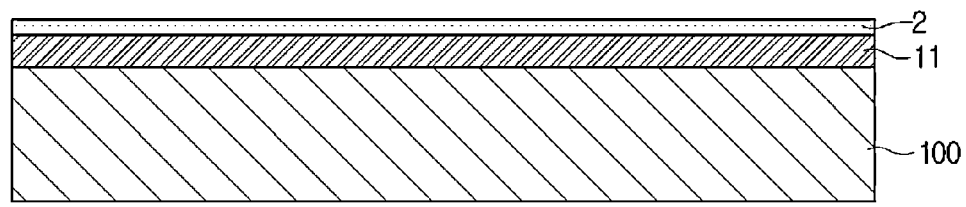

Next, the conductive material 13 may be patterned using the first buffer layer 12 and the first metallic material 11 as a mask, and a touch panel having a structure as illustrated in FIG. 52 may be manufactured.

Meanwhile, a process different from the above process may be performed on the bonding area BA where the circuit board is bonded to the wire. Hereinafter, a manufacturing method in the bonding area BA will be described with reference to FIGS. 54 to 56.

Referring to FIG. 52, a first metallic material 11 is formed in the bonding area BA shown in FIG. 34. This process may be the same as the process shown in FIG. 40 or FIG. 46.

After that, as shown in FIG. 42 or FIG. 48, when an imprinting process of the first buffer layer 12 is performed in an area other than the bonding area BA, the first buffer layer 2 may remain on the bonding area BA.

Figure 54:
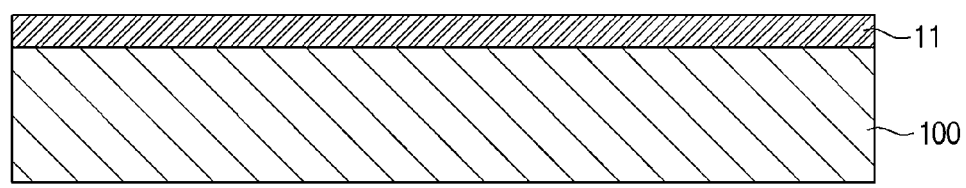

Referring to FIG. 54, the remaining first buffer layer 2 may be removed. In this case, when the first buffer layer 2 is removed in FIG. 43 or FIG. 49 described above, the first buffer layer 2 remaining in the bonding area BA may be removed together.

Figure 55:
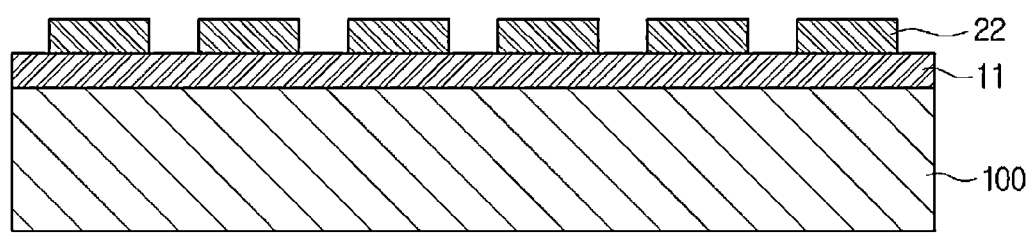

Next, referring to FIG. 55, a second metallic material 22 may be formed on the first metallic material 11 from which the first buffer layer 2 remaining is removed. The second metal material 22 may be formed by a printing process. In detail, the second metallic material 22 may be formed by a screen printing process. For example, the second metallic material 22 may have a pattern by forming Ag paste using a screen printing process.

Figure 56:
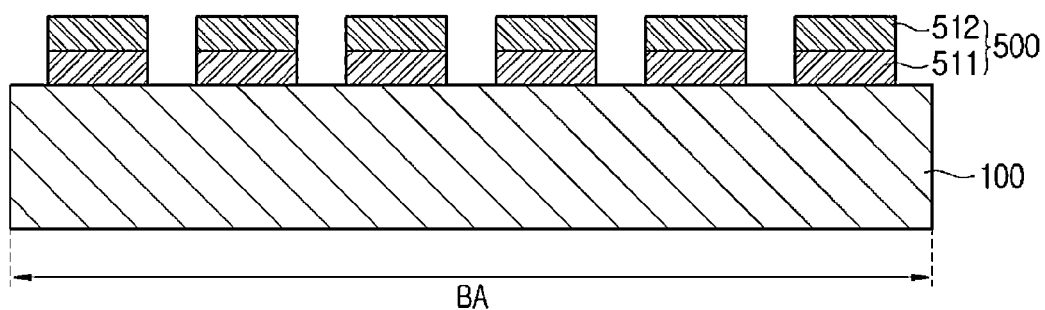

Next, referring to FIG. 56, the first metallic material 11 may be patterned using the second metallic material 22 as a mask. In this case, the first metallic material 11 may be patterned together with the patterning process of FIG. 45 or FIG. 51 as described above.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A touch panel comprising:
   a substrate comprising an active area to detect a position of an input device and an inactive area provided at a peripheral portion of the active area;
   a sensing electrode with a plurality of conductive patterns on the substrate;
   a top buffer layer disposed on a top surface of the sensing electrode; and
   a bottom buffer layer disposed at a bottom surface of the sensing electrode;
   wherein the sensing electrode is arranged with a shape of a mesh;
   wherein the sensing electrode comprises a metal;
   wherein a line width of the top buffer layer is greater than a line width of the sensing electrode;
   wherein a ratio of the line width of the sensing electrode to the line width of the top buffer layer is in a range of 1:1.3 to 1:2;
   wherein a line width of the bottom buffer layer is greater than the line width of the sensing electrode;
   wherein the top buffer layer comprises a first reflection prevention part and a second reflection prevention part surrounding the first reflection prevention part, and the second reflection prevention part is disposed on a lateral side of the sensing electrode;

wherein the top buffer layer and the bottom buffer layer each comprises a darkening layer;

wherein the second reflection prevention part is spaced apart from the lateral side of the sensing electrode;

wherein an end of the top buffer layer is disposed at a level lower than a height of the top surface of the sensing electrode;

wherein the second reflection prevention part is formed with an acute inclination angle with respect to the lateral side of the sensing electrode, wherein the second reflection prevention part is bent toward the substrate from the first reflection prevention part, wherein the bottom buffer layer is formed with a vertical inclination angle with respect to the lateral side of the sensing electrode, wherein the substrate is exposed between adjacent conductive patterns of the plurality of conductive patterns, wherein the sensing electrode is disposed on the active area of the substrate, and wherein the top buffer layer comprises material of a different etching rate in reaction to an etching than does the sensing electrode.

2. The touch panel of claim 1, wherein the sensing electrode further comprises a first sub-pattern, and the sensing electrode and the top buffer layer are disposed on the first sub-pattern.

3. The touch panel of claim 1, wherein the sensing electrode and the top buffer layer comprise mutually different materials.

4. The touch panel of claim 1, wherein an area of a top surface of the top buffer layer is wider than an area of the top surface of the sensing electrode.

5. The touch panel of claim 1, wherein a portion of the top buffer layer is spaced apart from the sensing electrode.

6. The touch panel of claim 1, further comprising a third reflection prevention part being bent and extending from the second reflection prevention part.

7. The touch panel of claim 6, wherein the third reflection prevention part is spaced apart from the substrate.

8. The touch panel of claim 1, wherein the sensing electrode comprises at least one of Cu, Au, Ag, Al, Ti, Ni, and an alloy thereof.

9. The touch panel of claim 1, wherein the top buffer layer comprises at least one of metal oxide, metal nitride, and metal oxynitride.

10. The touch panel of claim 1, further comprising a wire electrically connected to the sensing electrode; and a pad disposed at an end of the wire, wherein the pad comprises a first pad layer and a second pad layer on the first pad layer.

11. The touch panel of claim 10, wherein the wire comprises a first wire layer, and wherein the sensing electrode, the first wire layer, and the first pad layer each comprises a same material.

12. The touch panel of claim 11, further comprising a first buffer layer of the wire on the first wire layer.

13. The touch panel of claim 11, further comprising a conductive layer under at least one of the sensing electrode, the first wire layer, and the first pad layer.

14. The touch panel of claim 1, wherein the etching rate of the top buffer layer is slower than that of the sensing electrode.

15. A touch device comprising:

a touch panel;

wherein the touch panel comprises:

a substrate comprising an active area to detect a position of an input device and an inactive area provided at a peripheral portion of the active area;

a sensing electrode with a plurality of conductive patterns on the substrate;

a top buffer layer disposed on a top surface of the sensing electrode; and a bottom buffer layer disposed at a bottom surface of the sensing electrode;

wherein the sensing electrode is arranged with a shape of a mesh;

wherein the sensing electrode comprises a metal;

wherein a line width of the top buffer layer is greater than a line width of the sensing electrode;

wherein a ratio of the line width of the sensing electrode to the line width of the top buffer layer is in a range of 1:1.3 to 1:2;

wherein a line width of the bottom buffer layer is greater than the line width of the sensing electrode;

wherein the top buffer layer comprises a first reflection prevention part and a second reflection prevention part surrounding the first reflection prevention part, and the second reflection prevention part is disposed on a lateral side of the sensing electrode;

wherein the top buffer layer and the bottom buffer layer each comprises a darkening layer;

wherein the second reflection prevention part is spaced apart from the lateral side of the sensing electrode;

wherein an end of the top buffer layer is disposed at a level lower than a height of the top surface of the sensing electrode;

wherein the second reflection prevention part is formed with an acute inclination angle with respect to the lateral side of the sensing electrode, wherein the second reflection prevention part is bent toward the substrate from the first reflection prevention part, wherein the bottom buffer layer is formed with a vertical inclination angle with respect to the lateral side of the sensing electrode, wherein the substrate is exposed between adjacent conductive patterns of the plurality of conductive patterns, wherein the sensing electrode is disposed on the active area of the substrate, and wherein the to buffer layer comprises material of a different etching rate in reaction to an etching than does the sensing electrode.

* * * * *